United States Patent
Hurst et al.

(10) Patent No.: US 11,441,687 B2
(45) Date of Patent: Sep. 13, 2022

(54) PUMP FLUID END WITH POSITIONAL INDIFFERENCE FOR MAINTENANCE

(71) Applicant: Halliburton Energy Services, Inc., Houston, TX (US)

(72) Inventors: Justin Lee Hurst, Healdton, OK (US); James Alan Olis, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 187 days.

(21) Appl. No.: 16/411,911

(22) Filed: May 14, 2019

(65) Prior Publication Data
US 2020/0362971 A1    Nov. 19, 2020

(51) Int. Cl.
*F16K 3/02*    (2006.01)
*F04B 53/16*    (2006.01)
(Continued)

(52) U.S. Cl.
CPC .......... *F16K 3/0272* (2013.01); *F04B 1/0448* (2013.01); *F04B 53/02* (2013.01);
(Continued)

(58) Field of Classification Search
CPC ...... F04B 1/0448; F04B 39/14; F04B 39/041; F04B 53/166; F04B 53/22; F04B 53/02; F04B 53/10; F04B 53/16
See application file for complete search history.

(56) References Cited

U.S. PATENT DOCUMENTS 1,662,725 A    3/1928 Toney, Jr.
1,977,075 A * 10/1934 Magnuson ............... F16J 1/006
92/240

(Continued)

FOREIGN PATENT DOCUMENTS

CH    257522 A    10/1948
DE    19808724 A1    9/1998
(Continued)

OTHER PUBLICATIONS

Foreign Communication from Related Application—International Search Report and Written Opinion of the International Searching Authority, International Application No. PCT/US2020/022043, dated Jul. 3, 2020, 13 pages.

(Continued)

*Primary Examiner* — Philip E Stimpert
(74) *Attorney, Agent, or Firm* — Conley Rose, P.C.; Rodney B. Carroll

(57) ABSTRACT

A packing assembly for a pump fluid end comprising: a packing screw; a packing carrier; and a packing, wherein the packing screw, the packing carrier, and the packing are each cylindrical with a width measured along a central axis thereof that is less than a minimum spacing distance of a pump comprising the pump fluid end and a pump power end, wherein the pump fluid end comprises a reciprocating element bore in which a reciprocating element can be reciprocated via the pump power end via connection of the reciprocating element to a reciprocating element adapter coupled with a pushrod and crankshaft of the pump power end, wherein the minimum spacing distance is an axial distance measured along the central axis between a back of the pump fluid end and a front end of the reciprocating element adapter when the crankshaft of the pump power end is at top dead center.

20 Claims, 12 Drawing Sheets

(51) Int. Cl.
- *F04B 53/10* (2006.01)
- *F04B 1/0448* (2020.01)
- *F04B 53/02* (2006.01)
- *F04B 53/22* (2006.01)

(52) U.S. Cl.
CPC .............. *F04B 53/10* (2013.01); *F04B 53/16* (2013.01); *F04B 53/22* (2013.01)

(56) References Cited

U.S. PATENT DOCUMENTS

| | | | |
|---|---|---|---|
| 2,673,519 A | 3/1954 | Halliburton | |
| 2,678,006 A | 5/1954 | Gray | |
| 3,005,412 A * | 10/1961 | Camp | F04B 53/142 |
| | | | 417/568 |
| 3,229,640 A | 1/1966 | Williams | |
| 3,299,417 A | 1/1967 | Sibthorpe | |
| 3,301,197 A | 1/1967 | Dodson et al. | |
| 3,380,247 A | 4/1968 | Colmerauer | |
| 3,459,363 A | 8/1969 | Miller | |
| 3,516,434 A | 6/1970 | Noss | |
| 3,664,371 A | 5/1972 | Schneider | |
| 3,887,305 A | 6/1975 | Ito | |
| 4,341,235 A | 7/1982 | Nord | |
| 4,478,561 A | 10/1984 | Elliston | |
| 4,784,588 A | 11/1988 | Miyashita et al. | |
| 4,850,392 A | 7/1989 | Crump et al. | |
| 4,939,923 A | 7/1990 | Sharp | |
| 5,040,408 A | 8/1991 | Webb | |
| 5,061,159 A | 10/1991 | Pryor | |
| 5,072,622 A | 12/1991 | Roach et al. | |
| 5,176,025 A | 1/1993 | Butts | |
| 5,343,738 A | 9/1994 | Skaggs | |
| 5,403,168 A | 4/1995 | Evenson | |
| 5,720,325 A | 2/1998 | Grantham | |
| 5,924,853 A | 7/1999 | Pacht | |
| 6,032,699 A | 3/2000 | Cochran et al. | |
| 6,082,392 A | 7/2000 | Watkins, Jr. | |
| 6,164,188 A | 12/2000 | Miser | |
| 6,342,272 B1 | 1/2002 | Halliwell | |
| 6,607,010 B1 | 8/2003 | Kashy | |
| 6,935,161 B2 | 8/2005 | Hutchinson | |
| 7,798,165 B2 | 9/2010 | McClung, Jr. | |
| 8,234,911 B2 | 8/2012 | Jax | |
| 8,360,751 B2 | 1/2013 | Duncan | |
| 8,366,408 B2 | 2/2013 | Wago et al. | |
| 8,418,363 B2 | 4/2013 | Patel | |
| 8,506,262 B2 | 8/2013 | Leugemors et al. | |
| 8,550,102 B2 | 10/2013 | Small | |
| 8,590,614 B2 | 11/2013 | Surjaatmadja et al. | |
| 9,243,630 B2 * | 1/2016 | Foote | F04B 53/14 |
| 9,499,895 B2 | 11/2016 | Langan et al. | |
| 9,528,508 B2 | 12/2016 | Thomeer et al. | |
| 9,617,654 B2 | 4/2017 | Rajagopalan et al. | |
| 9,822,894 B2 | 11/2017 | Bayyouk et al. | |
| 2007/0044848 A1 | 3/2007 | Norman | |
| 2007/0267076 A1 | 11/2007 | Strauss et al. | |
| 2008/0011057 A1 | 1/2008 | Spaolonzi et al. | |
| 2008/0080994 A1 * | 4/2008 | Gambier | F04B 53/16 |
| | | | 417/534 |
| 2009/0041588 A1 | 2/2009 | Hunter et al. | |
| 2009/0041596 A1 | 2/2009 | Ponomarev et al. | |
| 2009/0159133 A1 | 6/2009 | Popke et al. | |
| 2009/0194174 A1 | 8/2009 | Morgan et al. | |
| 2009/0246051 A1 | 10/2009 | Kim | |
| 2009/0278069 A1 | 11/2009 | Blanco et al. | |
| 2010/0098568 A1 | 4/2010 | Marica | |
| 2010/0126250 A1 | 5/2010 | Jax | |
| 2011/0180740 A1 | 7/2011 | Marica | |
| 2012/0148431 A1 | 6/2012 | Gabriel | |
| 2012/0223267 A1 | 9/2012 | Marica | |
| 2012/0279721 A1 | 11/2012 | Surjaatmadja et al. | |
| 2012/0312402 A1 | 12/2012 | Tyler | |
| 2013/0061942 A1 | 3/2013 | Hulsey | |
| 2013/0319220 A1 | 12/2013 | Lahuraka et al. | |
| 2014/0064996 A1 | 3/2014 | Arima | |
| 2014/0127036 A1 | 5/2014 | Buckley et al. | |
| 2014/0127058 A1 | 5/2014 | Buckley et al. | |
| 2014/0127062 A1 | 5/2014 | Buckley et al. | |
| 2014/0150889 A1 | 6/2014 | Ragner | |
| 2014/0261790 A1 | 9/2014 | Marica | |
| 2014/0312257 A1 | 10/2014 | Marica | |
| 2014/0322050 A1 | 10/2014 | Marette et al. | |
| 2014/0328701 A1 | 11/2014 | Nathan | |
| 2014/0348677 A1 | 11/2014 | Moeller et al. | |
| 2014/0356201 A1 | 12/2014 | Blume | |
| 2015/0132157 A1 | 5/2015 | Whaley et al. | |
| 2016/0131131 A1 * | 5/2016 | Weaver | F04B 1/0408 |
| | | | 277/300 |
| 2016/0131264 A1 | 5/2016 | Bregazzi et al. | |
| 2016/0215588 A1 | 7/2016 | Belshan et al. | |
| 2016/0281699 A1 | 9/2016 | Gnessin et al. | |
| 2016/0319805 A1 | 11/2016 | Dille | |
| 2018/0058431 A1 | 3/2018 | Blume | |
| 2018/0058444 A1 | 3/2018 | Blume | |
| 2018/0171999 A1 * | 6/2018 | Brown | F04B 1/053 |
| 2018/0202434 A1 | 7/2018 | Barnhouse, Jr. et al. | |
| 2018/0298894 A1 | 10/2018 | Wagner et al. | |
| 2019/0011051 A1 | 1/2019 | Yeung | |
| 2019/0120389 A1 | 4/2019 | Foster et al. | |
| 2019/0145391 A1 | 5/2019 | Davids | |
| 2019/0226475 A1 | 7/2019 | Stark et al. | |
| 2020/0347706 A1 | 11/2020 | Nowell et al. | |

FOREIGN PATENT DOCUMENTS

| | | |
|---|---|---|
| EP | 0580196 A1 | 1/1994 |
| EP | 1103722 A2 | 5/2001 |
| EP | 2383470 A1 | 11/2011 |
| GB | 120622 A | 11/1918 |
| GB | 450645 A | 7/1936 |
| GB | 672173 A | 5/1952 |
| GB | 1226014 A | 3/1971 |
| GB | 1262826 A | 2/1972 |
| JP | 63001012 Y2 | 1/1988 |
| JP | 2002037217 A | 2/2002 |
| JP | 2004257283 A | 9/2004 |
| JP | 4121804 B2 | 7/2008 |
| JP | 2009131747 A | 6/2009 |
| JP | 5107651 B2 | 12/2012 |
| JP | 2020040010 A | 3/2020 |

OTHER PUBLICATIONS

Kiani, Mahdi et al., "Numerical Modeling and Analytical Investigation of Autofrettage Process on the Fluid End Module of Fracture Pumps," Journal of Pressure Vessel Technology, Aug. 2018, pp. 0414031-0414037, vol. 140, ASME.

"Pump Catalog," Cat Pumps, Inc., 2014, 24 pages.

Furuta, Katsunori et al., "Study of the In-Line Pump System for Diesel Engines to Meet Future Emission Regulations," SAE International Congress and Exposition, Feb. 1998, pp. 125-136, Society of Automotive Engineers, Inc.

"550 Series: High Pressure, High Flow Water Jetting," Gardner Denver Water Jetting Systems, Inc., 2009, 4 pages.

Houghton, J.E. et al., "Improved Pump Run Time Using Snow Auto-Rotating Plunger (SARP) Pump," SPE Western Regional Meeting, May 1998, SPE46217, 6 pages, Society of Petroleum Engineers, Inc.

"Improved Double Acting Pump," Scientific American, 1867, pp. 248, vol. 17, No. 16, American Periodicals.

Langewis, Jr., C. et al., "Practical Hydraulics of Positive Displacement Pumps for High-Pressure Waterflood Installations," Journal of Petroleum Technology, Feb. 1971, pp. 173-179, SPE-AIME/Continental Oil Co.

Petzold, Martin et al., "Visualization and Analysis of the Multiphase Flow in an Electromagnetically Driven Dosing Pump," ASME/BATH Symposium on Fluid Power & Motion Control, Oct. 2013, FPMC2013-4433, 6 pages, ASME.

Romer, M. C. et al., "Field Trial of a Novel Self-Reciprocating Hydraulic Pump for Deliquification," SPE Production & Operations, 2017, 12 pages, Society of Petroleum Engineers.

(56) References Cited

OTHER PUBLICATIONS

Foreign Communication from Related Application—International Search Report and Written Opinion of the International Searching Authority, International Application No. PCT/US2020/022093, dated Jul. 6, 2020, 11 pages.
Filing Receipt and Specification for patent application entitled "Flexible Manifold for Reciprocating Pump," by Joseph A. Beisel, et al., filed Oct. 7, 2019 as U.S. Appl. No. 16/594,825.
Office Action (Restriction Requirement) dated Aug. 28, 2019, (7 pages), U.S. Appl. No. 16/522,874, filed Jul. 26, 2019.
Office Action (Restriction Requirement) dated Aug. 30, 2019, (5 pages), U.S. Appl. No. 16/436,356, filed Jun. 10, 2019.
Office Action dated Oct. 22, 2019 (27 pages), U.S. Appl. No. 16/522,874, filed Jul. 26, 2019.
Office Action dated Oct. 31, 2019 (21 pages), U.S. Appl. No. 16/436,356, filed Jun. 10, 2019.
Scully Intellicheck2, Complete Overfill Prevention and Retained Product Monitoring System, 67293 Rev B, Oct. 2013, 2 pages.
Scully Intellicheck2, Complete Overfill Prevention and Retained Product Monitoring System, 67293 Rev B, May 2014, 2 pages.
Scully Intellicheck3, Complete Overfill Prevention and Retained Product Monitoring System, XXXXX Rev A, Jun. 2016, 2 pages.
Acknowledgement receipt and specification for patent application entitled, "Pump Fluid End with Easy Access Suction Valve," by Justin L. Hurst, et al., filed May 14, 2019 as U.S. Appl. No. 16/411,891.
Acknowledgement receipt and specification for patent application entitled, "Easy Change Pump Plunger," by Justin L. Hurst, et al., filed May 14, 2019 as U.S. Appl. No. 16/411,894.
Acknowledgement receipt and specification for patent application entitled, "Pump Valve Seat with Supplemental Retention," by Justin L. Hurst, et al., filed May 14, 2019 as U.S. Appl. No. 16/411,898.
Acknowledgement receipt and specification for patent application entitled, "Flexible Manifold for Reciprocating Pump," by Joseph A. Beisel, et al., filed May 14, 2019 as U.S. Appl. No. 16/411,901.
Acknowledgement receipt and specification for patent application entitled, "Valve Assembly for a Fluid End with Limited Access," by Justin L. Hurst, et al., filed May 14, 2019 as U.S. Appl. No. 16/411,910.
Acknowledgement receipt and specification for patent application entitled, "Pump Plunger with Wrench Features," by Justin L. Hurst, et al., filed May 14, 2019 as U.S. Appl. No. 16/411,905.
Acknowledgement receipt and specification for patent application entitled "Pump Fluid End with Suction Valve Closure Assist," by Justin L. Hurst, et al., filed Jun. 10, 2019 as U.S. Appl. No. 16/436,312.
Acknowledgement receipt and specification for patent application entitled "Multi-Material Frac Valve Poppet," by Jim B. Surjaatmadja, et al., filed Jun. 10, 2019 as U.S. Appl. No. 16/436,356.
Acknowledgement receipt and specification for patent application entitled "Multi-Layer Coating for Plunger and/or Packing Sleeve," by Justin L. Hurst, et al., filed Jun. 10, 2019 as U.S. Appl. No. 16/436,389.
Acknowledgement receipt and specification for International application entitled "Multi-Layer Coating for Plunger and/or Packing Sleeve," by Justin L. Hurst, et al., filed Jun. 12, 2019 as International application No. PCT/US2019/036785.
Acknowledgement receipt and specification for patent application entitled, "Oil Field Pumps with Reduced Maintenance," by Jim B. Surjaatmadja, et al., filed Jul. 26, 2019 as U.S. Appl. No. 16/522,860.
Acknowledgement receipt and specification for patent application entitled, "Fail Safe Suction Hose for Significantly Moving Suction Port," by Jim B. Surjaatmadja, et al., filed Jul. 26, 2019 as U.S. Appl. No. 16/522,874.
Acknowledgement receipt and specification for International application entitled "Oil Field Pumps with Reduced Maintenance," by Jim B. Surjaatmadja, et al., filed Jul. 30, 2019 as International application No. PCT/US2019/044191.
Acknowledgement receipt and specification for International application entitled "Fail Safe Suction Hose for Significantly Moving Suction Port," by Jim B. Surjaatmadja, et al., filed Jul. 30, 2019 as International application No. PCT/US2019/044194.

\* cited by examiner

PUMP FLUID END WITH POSITIONAL INDIFFERENCE FOR MAINTENANCE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present disclosure relates generally to a method and apparatus for supplying pressurized fluids. More particularly, the present disclosure relates to methods and reciprocating devices for pumping fluids into a wellbore.

BACKGROUND

High-pressure pumps having reciprocating elements such as plungers or pistons are commonly employed in oil and gas production fields for operations such as drilling and well servicing. For instance, one or more reciprocating pumps may be employed to pump fluids into a wellbore in conjunction with activities including fracturing, acidizing, remediation, cementing, and other stimulation or servicing activities. Due to the harsh conditions associated with such activities, many considerations are generally taken into account when designing a pump for use in oil and gas operations. One design consideration may concern ease of access to pump fluid end components, as reciprocating pumps used in wellbore operations, for example, often encounter high cyclical pressures and various other conditions that can render pump components susceptible to wear and result in a need for servicing and maintenance of the pump.

Accordingly, it is desirable to provide a pump fluid end that facilitate access to the pump fluid end and components therein, such as a packing assembly and components thereof, a reciprocating element, components of a suction valve assembly, components of a discharge valve assembly, or a combination thereof.

BRIEF SUMMARY OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
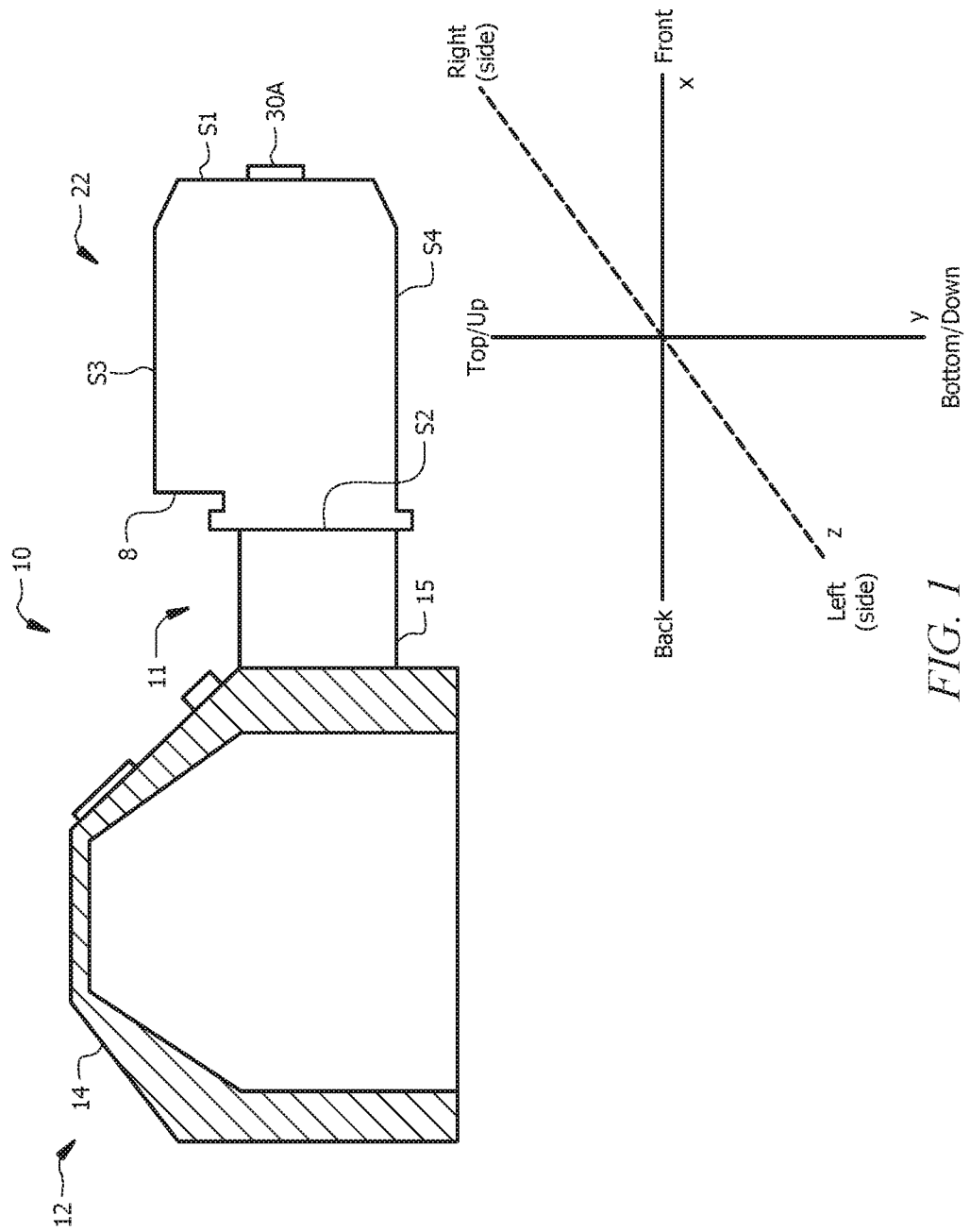
FIG. 1 is an elevational view of a reciprocating pump, according to embodiments of this disclosure.

Disclosed herein are a packing assembly and a reciprocating apparatus comprising the packing assembly and operable for pumping pressurized fluid. The packing assembly comprises a packing screw, a packing carrier, and a packing. The packing screw, the packing carrier, and the packing are each cylindrical and have a width measured along a central axis thereof that is less than a minimum spacing distance of a pump 10 comprising a pump fluid end 22 and a pump power end 12. The pump fluid end 22 comprises a reciprocating element bore 24 in which a reciprocating element 18 can be reciprocated via the pump power end 12 via connection of a tail end 62 of the reciprocating element 18 to a reciprocating element adapter coupled with a pushrod 30 and crankshaft 16 of the pump power end 12. The minimum spacing distance is an axial distance measured along the central axis (e.g., central axis 17 of the reciprocating element bore 24 which, when the packing assembly is positioned in the pump fluid end 22, is coaxial with the central axis of the components of the packing assembly) between the back S2 of the pump fluid end (e.g., back S2 of the pump fluid end 22 proximal the pump power end 12; FIG. 1) and a front end of the reciprocating element adapter (or, as described below, another component of mechanical linkages 4 or a front of the pump power end 12, whichever is closer to back S2 of pump fluid end 22) when the crankshaft 16 of the pump power end 12 is at top dead center (TDC).

Upon positioning of the packing and the packing carrier within the reciprocating element bore 24, a back side of the packing axially proximate the pump power end 12 contacts a front side of the packing carrier axially distal the pump power end 12, a front side of the packing screw axially distal the pump power end 12 contacts a back side of the packing carrier axially proximate the pump power end 12, and the packing screw retains the packing and the packing carrier in the reciprocating element bore 24. In embodiments, the packing screw comprises threads on at least a portion of an outside diameter thereof, whereby the packing screw can be threadably connected with a mating thread on an inside diameter of the reciprocating element bore 24 (e.g., of fluid end body 8 and/or a sleeve therein). Design of the packing assembly such that the packing, the packing screw, and the packing carrier have a width measured along the central axis thereof that is less than the minimum spacing distance of pump 10 enables removal of the packing screw, the packing carrier, and the packing from the back S2 of the pump fluid end 22 through the minimum spacing distance when crankshaft 16 of pump 10 is at TDC. In embodiments, the reciprocating apparatus is a high-pressure pump 10 configured to operate at a pressure greater than or equal to about 3,000 psi and/or in a well servicing operation and environment.

In embodiments, the reciprocating apparatus comprises a reciprocating element comprising a cylindrical body having a front end opposite a tail end, and a central axis. The tail end of the cylindrical body is configured to be operatively connected to a pump power end operable to reciprocate the reciprocating element along a path within a bore of a pump fluid end during operation of a pump comprising the pump power end, the pump fluid end, and the reciprocating element. According to this disclosure, the front end of the cylindrical body of the reciprocating element comprises one or more tool engagement features positioned about an outer circumference of the front end of the cylindrical body of the reciprocating element. The one or more tool engagement features are adapted to engage a corresponding one or more reciprocating element engagement features of a reciprocating element end of a tool, such that the reciprocating element can be rotated, pulled, and/or pushed via the tool relative to the central axis of the cylindrical body. In embodiments, the reciprocating apparatus is a high-pressure pump configured to operate at a pressure greater than or equal to about 3,000 psi and/or in a well servicing operation and environment.

A reciprocating apparatus of this disclosure may comprise any suitable pump operable to pump fluid. Non-limiting examples of suitable pumps include, but are not limited to, piston pumps, plunger pumps, and the like. In embodiments, the pump is a rotary- or reciprocating-type pump such as a positive displacement pump operable to displace pressurized fluid. The pump comprises a pump power end, a pump fluid end, and an integration section whereby a reciprocating element (e.g., a plunger) can be mechanically connected with the pump power end such that the reciprocating element can be reciprocated within a reciprocating element bore of the pump fluid end. FIG. 1 is an elevational view (e.g., side view) of a pump 10 (e.g., a reciprocating pump) according to an exemplary embodiment, the reciprocating pump comprising a pump power end 12, a pump fluid end 22, and an integration section 11. As illustrated in FIG. 1, pump fluid end has a front S1 opposite a back S2 along a first or x-axis, a top S3 opposite a bottom S4 along a second or y-axis, wherein the y-axis is in the same plane as and perpendicular to the y-axis, and a left side and a right side along a z-axis, wherein the x-axis is along a plane perpendicular to the plane of the x-axis and the y-axis. Accordingly, toward the top of pump fluid end 22 (and pump 10) is along the y-axis toward top S3, toward the bottom of pump fluid end 22 (and pump 10) is along the y-axis toward bottom S4, toward the front of pump fluid end 22 (and pump 10) is along the x-axis toward front S1, and toward the back of pump fluid end 22 (and pump 10) is along the x-axis away from front S1.

Figure 2:
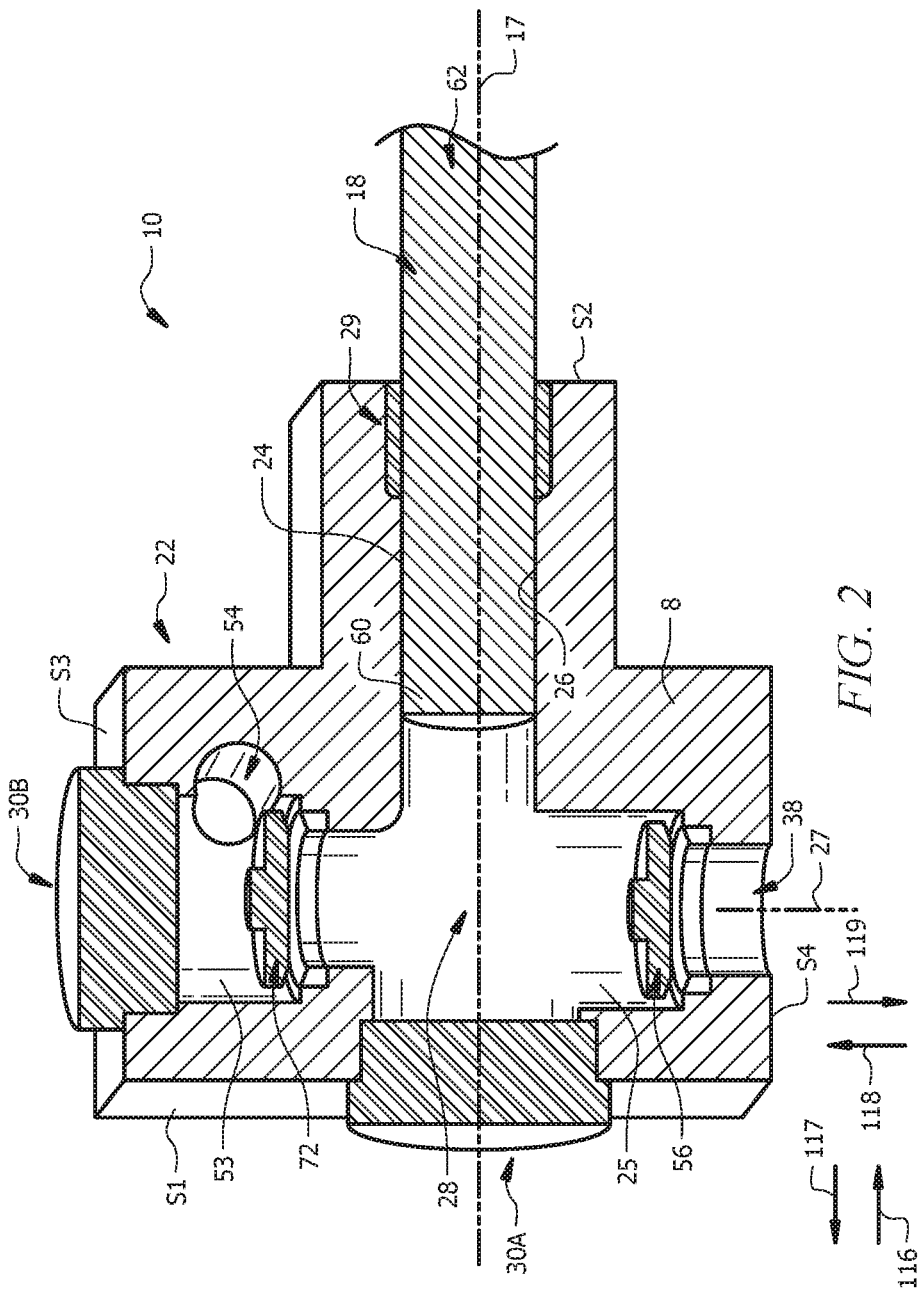
FIG. 2 is a cut-away illustration of an exemplary reciprocating pump comprising a cross-bore pump fluid end, according to embodiments of the present disclosure.
Figure 3:
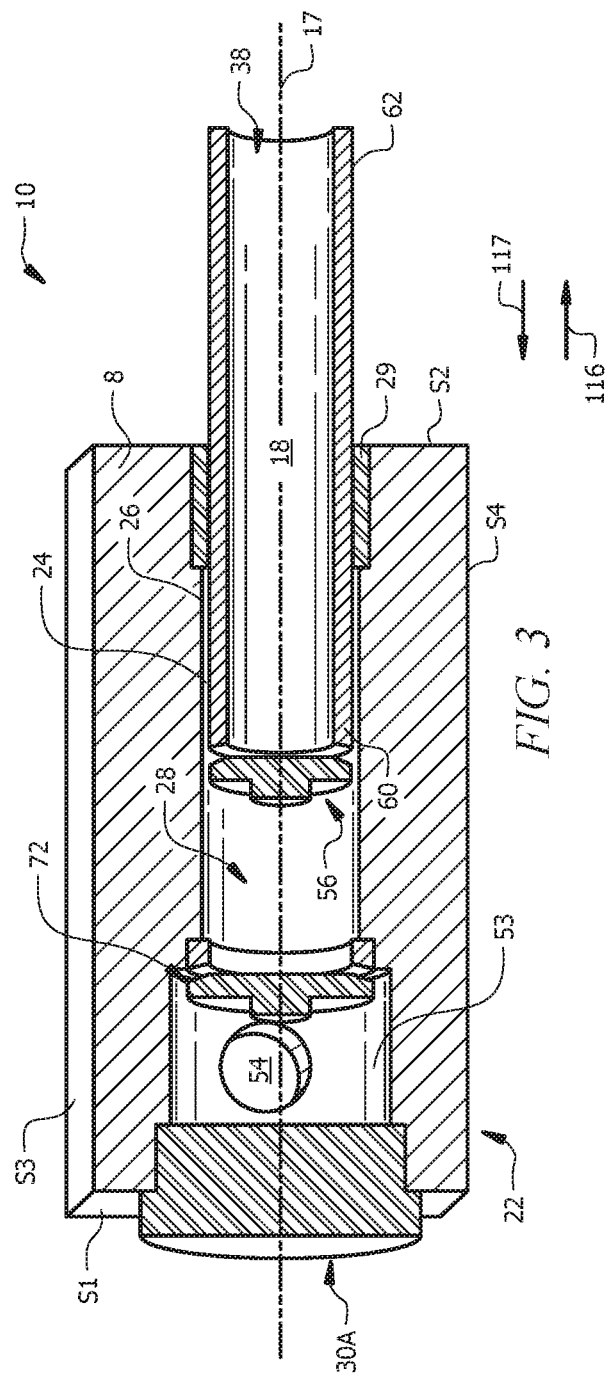
FIG. 3 is a cut-away illustration of an exemplary reciprocating pump comprising a concentric bore pump fluid end, according to embodiments of the present disclosure.

The pump fluid end 22 is integrated with the pump power end 12 via the integration section 11, such that pump power end 12 is operable to reciprocate the reciprocating element 18 within a reciprocating element bore 24 (FIGS. 2-3) of the pump fluid end 22. The reciprocating element bore 24 is at least partially defined by a cylinder wall 26. As described further hereinbelow with reference to FIG. 2 and FIG. 3, pump fluid end 22 can be a cross-bore pump fluid end 22 or, alternatively, an in-line or "concentric" bore pump fluid end. As utilized herein, cross-bore pump fluid ends can comprise "T-bore" pump fluid ends, "X-bore" (e.g., cross shaped bore) pump fluid ends, or "Y-bore" pump fluid ends. FIG. 2 is a schematic showing a cross-bore pump fluid end 22 engaged with a reciprocating element 18 and FIG. 3 is a schematic showing a concentric bore pump fluid end 22 engaged with a reciprocating element 18. As discussed further below, the pump 10 includes at least one fluid inlet 38 for receiving fluid from a fluid source, e.g., a suction line, suction header, storage or mix tank, blender, discharge from a boost pump such as a centrifugal pump, etc. The pump 10 also includes at least one discharge outlet 54 for discharging fluid to a discharge source, e.g., a flowmeter, pressure monitoring and control system, distribution header, discharge line, wellhead, discharge manifold pipe, and the like.

The pump 10 may comprise any suitable pump power end 12 for enabling the pump 10 to perform pumping operations (e.g., pumping a wellbore servicing fluid downhole). Similarly, the pump 10 may include any suitable housing 14 for containing and/or supporting the pump power end 12 and components thereof. The housing 14 may comprise various combinations of inlets, outlets, channels, and the like for circulating and/or transferring fluid. Additionally, the housing 14 may include connections to other components and/or systems, such as, but not limited to, pipes, tanks, drive mechanisms, etc. Furthermore, the housing 14 may be configured with cover plates or entryways for permitting access to the pump power end 12 and/or other pump components. As such, the pump 10 may be inspected to determine whether parts need to be repaired or replaced. The pump power end may also be hydraulically driven, whether it is a non-intensifying or an intensifying system.

Figure 4:
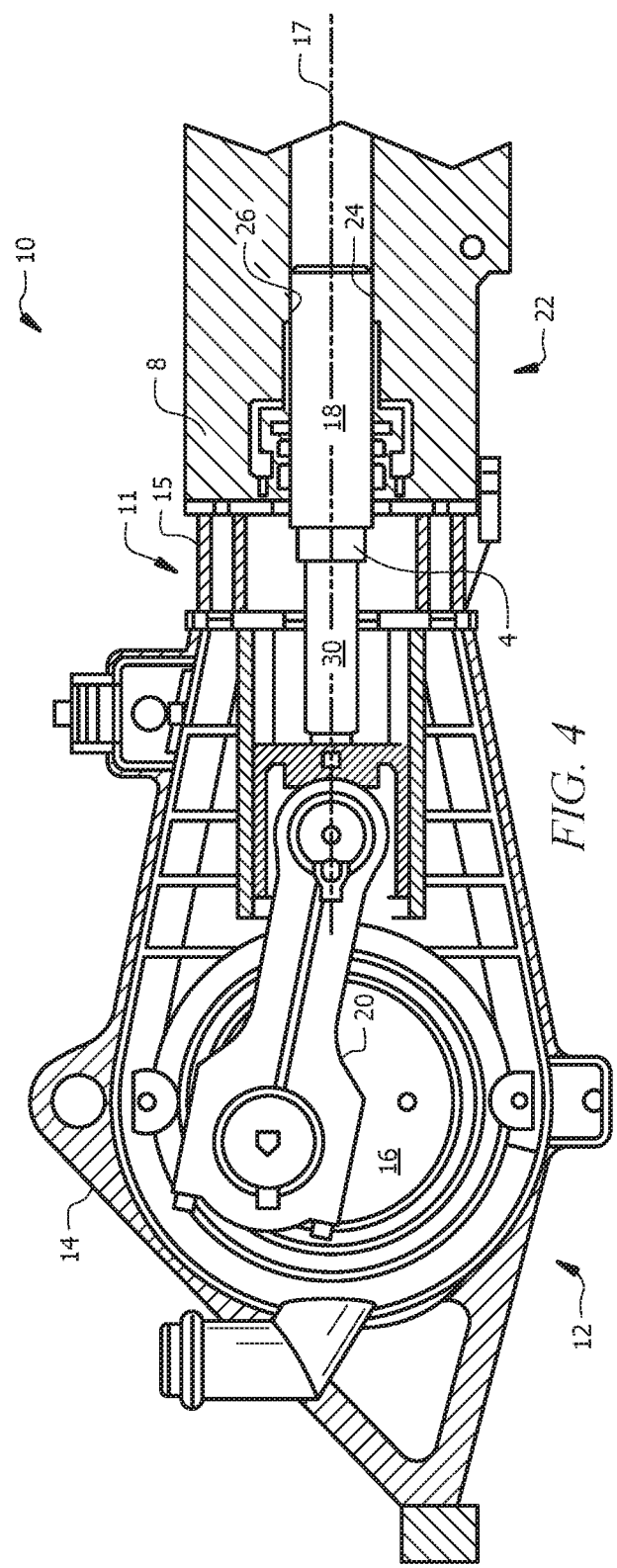
FIG. 4 is cut-away illustration of a pump power end of a pump, according to embodiments of the present disclosure.

Those versed in the art will understand that the pump power end 12 may include various components commonly employed in pumps. Pump power end 12 can be any suitable pump known in the art and with the help of this disclosure to be operable to reciprocate reciprocating element 18 in reciprocating element bore 24. For example, without limitation, pump power end 12 can be operable via and comprise a crank and slider mechanism, a powered hydraulic/pneumatic/steam cylinder mechanism or various electric, mechanical or electro-mechanical drives. FIG. 4 provides a cutaway illustration of an exemplary pump 10 of this disclosure, showing an exemplary pump power end 12, integrated via integration section 11 with a pump fluid end 22, wherein the pump power end 12 is operable to reciprocate the reciprocating element 18 within a reciprocating element bore 24 of the pump fluid end 22. Briefly, for example, the pump power end 12 may include a rotatable crankshaft 16 attached to at least one reciprocating element 18 (e.g., a plunger or piston) by way of a crank arm/ connecting rod 20. Additionally, an engine (e.g., a diesel engine), motor, or other suitable power source may be operatively connected to the crankshaft 16 (e.g., through a transmission and drive shaft) and operable to actuate rotation thereof. In operation, rotation of the crankshaft 16 induces translational movement of the crank arm/connecting rod 20, thereby causing the reciprocating element 18 to extend and retract along a flow path, which may generally be defined by a central axis 17 within a reciprocating element bore 24 (sometimes referred to herein for brevity as a "reciprocating element bore 24" or simply a "bore 24", although not wishing to be limited to a particular reciprocating element 18). Pump 10 of FIG. 1 is typically mounted on a movable structure such as a semi-tractor trailer or skid, and the moveable structure may contain additional components, such as a motor or engine (e.g., a diesel engine), that provides power (e.g., mechanical motion) to the pump power end 12 (e.g., a crankcase comprising crankshaft 16 and related connecting rods 20).

Of course, numerous other components associated with the pump power end 12 of the pump 10 may be similarly employed, and therefore, fall within the purview of the present disclosure. Furthermore, since the construction and operation of components associated with pumps of the sort depicted in FIG. 1 are well known and understood, discussion of the pump 10 will herein be limited to the extent necessary for enabling a proper understanding of the disclosed embodiments.

As noted hereinabove, the pump 10 comprises a pump fluid end 22 attached to the pump power end 12. Various embodiments of the pump fluid end 22 are described in detail below in connection with other drawings, for example FIGS. 2 and 3. Generally, the pump fluid end 22 comprises at least one fluid inlet 38 for receiving fluid, and at least one discharge outlet 54 through which fluid flows out of the discharge chamber 53. The pump fluid end 22 also comprises at least one valve assembly for controlling the receipt and output of fluid. For example, the pump fluid end 22 can comprise a suction valve assembly 56 and a discharge valve assembly 72. The pump fluid end 22 may include any suitable component(s) and/or structure(s) for containing and/or supporting the reciprocating element 18 and providing a cylinder wall 26 at least partially defining a reciprocating element bore 24 along which the pump power end can reciprocate the reciprocating element during operation of the pump.

In embodiments, the pump fluid end 22 may comprise a cylinder wall 26 at least partially defining a bore 24 through which the reciprocating element 18 may extend and retract. Additionally, the bore 24 may be in fluid communication with a discharge chamber 53 formed within the pump fluid end 22. Such a discharge chamber 53, for example, may be configured as a pressurized discharge chamber 53 having a discharge outlet 54 through which fluid is discharged by the reciprocating element 18. Thus, the reciprocating element 18 may be movably disposed within the reciprocating element bore 24, which may provide a fluid flow path into and/or out of the pump chamber. During operation of the pump 10, the reciprocating element 18 may be configured to reciprocate along a path (e.g., along central axis 17 within bore 24 and/or pump chamber 28, which corresponds to reciprocal movement parallel to the x-axis of FIG. 1) to transfer a supply of fluid to the pump chamber 28 and/or discharge fluid from the pump chamber 28.

In operation, the reciprocating element 18 extends and retracts along a flow path to alternate between providing forward strokes (also referred to as discharge strokes and correlating to movement in a positive direction parallel to the x-axis of FIG. 1) and return strokes (also referred to as suction strokes and correlating to movement in a negative direction parallel to the x-axis of FIG. 1), respectively. During a forward stroke, the reciprocating element 18 extends away from the pump power end 12 and toward the pump fluid end 22. Before the forward stoke begins, the reciprocating element 18 is in a fully retracted position (also referred to as bottom dead center (BDC) with reference to the crankshaft 16), in which case the suction valve assembly 56 can be in a closed configuration having allowed fluid to flow into the (e.g., high pressure) pump chamber 28. (As utilized here, "high pressure" indicates possible subjection to high pressure during discharge.) When discharge valve assembly 72 is in a closed configuration (e.g., under the influence of a closing mechanism, such as a spring), the high pressure in a discharge pipe or manifold containing discharge outlet 54 prevents fluid flow into discharge chamber 53 and causes pressure in the pump chamber 28 to accumulate upon stroking of the reciprocating element 18. When the reciprocating element 18 begins the forward stroke, the pressure builds inside the pump chamber 28 and acts as an opening force that results in positioning of the discharge valve assembly 72 in an open configuration, while a closing force (e.g., via a closing mechanism, such as a spring and/or pressure increase inside pump chamber 28) urges the suction valve assembly 56 into a closed configuration. When utilized in connection with a valve assembly, 'open' and 'closed' refer, respectively, to a configuration in which fluid can flow through the valve assembly (e.g., can pass between a valve body and a valve seat thereof) and a configuration in which fluid cannot flow through the valve assembly (e.g., cannot pass between a valve body and a valve seat thereof). As the reciprocating element 18 extends forward, fluid within the pump chamber 28 is discharged through the discharge outlet 54.

During a return stroke, the reciprocating element 18 reciprocates or retracts away from the pump fluid end 22 and towards the pump power end 12 of the pump 10. Before the return stroke begins, the reciprocating element 18 is in a fully extended position (also referred to as top dead center (TDC) with reference to the crankshaft 16), in which case the discharge valve assembly 72 can be in a closed configuration having allowed fluid to flow out of the pump chamber 28 and the suction valve assembly 56 is in a closed configuration. When the reciprocating element 18 begins and retracts towards the pump power end 12, the discharge valve assembly 72 assumes a closed configuration, while the suction valve assembly 56 opens. As the reciprocating element 18 moves away from the discharge valve 72 during a return stroke, fluid flows through the suction valve assembly 56 and into the pump chamber 28.

With reference to the embodiment of FIG. 2, which is a schematic showing a cross-bore pump fluid end 22 engaged with a reciprocating element 18, cross-bore pump fluid end 22 comprises a cross-bore fluid end body 8, a cross-bore pump chamber 28, a suction valve assembly 56, and a discharge valve assembly 72. In this cross-bore configuration, suction valve assembly 56 and discharge valve assembly 72 are located in a bore or channel 25 (also referred to herein as a cross bore 25) of pump chamber 28, wherein bore 25 has a central axis 27 that is parallel to the y-axis of FIG. 1 and is perpendicular to bore 24 in which reciprocating element 18 reciprocates during operation. Suction valve assembly 56 and discharge valve assembly 72 are operable to direct fluid flow within the pump 10. When reciprocating element 18 retracts, or moves along central axis 17 in a direction away from the pump chamber 28 and the pump fluid end 22 and toward the pump power end 12 (as indicated by arrow 116), a suction valve of the suction valve assembly 56 opens (e.g., either under natural flow or other biasing means), and a discharge valve of discharge valve assembly 72 will be closed, whereby fluid enters pump chamber 28 via fluid inlet 38. When the reciprocating element 18 reverses direction, due to the action of the pump power end 12, the reciprocating element 18 reverses direction along central axis 17, now moving in a direction toward the pump chamber 28 and pump fluid end 22 and away from pump power end 12 (as indicated by arrow 117), and the discharge valve of discharge valve assembly 72 is open and the suction valve of suction valve assembly 56 is closed (e.g., again either due to fluid flow and/or other biasing means of valve control), such that fluid is pumped out of pump chamber 28 via discharge outlet 54.

With reference to the embodiment of FIG. 3, which is a schematic showing a concentric pump fluid end 22 engaged with a reciprocating element 18, concentric bore pump fluid end 22 comprises a concentric bore fluid end body 8, a concentric pump chamber 28, a suction valve assembly 56, and a discharge valve assembly 72. In this concentric bore configuration, suction valve assembly 56 and discharge valve assembly 72 are positioned in-line (also referred to as coaxial) with reciprocating element bore 24, i.e., central axis 17 of reciprocating element bore 24 is also the central axis of suction pump assembly 56 and discharge valve assembly 72). Suction valve assembly 56 and discharge valve assembly 72 are operable to direct fluid flow within the pump 10. In some concentric bore fluid end designs, fluid flows within a hollow reciprocating element (e.g., a hollow plunger) 18. In some such embodiments, the reciprocating element bore 24 of such a concentric bore fluid end design can be defined by a high pressure cylinder 26 providing a high pressure chamber and a low pressure cylinder (not depicted in the embodiment of FIG. 3) providing a low pressure chamber toward tail end 62 of reciprocating element 18, whereby fluid from fluid inlet 38 enters reciprocating element 18. When reciprocating element 18 retracts, or moves along central axis 17 in a direction away from the pump chamber 28 and pump fluid end 22 and toward pump power end 12 (as indicated by arrow 116), a suction valve of the suction valve assembly 56 opens (e.g., either under natural flow and/or other biasing means), and a discharge valve of discharge valve assembly 72 will be closed, whereby fluid enters pump chamber 28 via a fluid inlet 38. For a concentric bore pump fluid end 22 design, the fluid inlet can be configured to introduce fluid into pump chamber 28 via a reciprocating element 18 that is hollow and/or via a low pressure chamber as described above. When the reciprocating element 18 reverses direction, due to the action of the pump power end 12, the reciprocating element 18 reverses direction along central axis 17, now moving in a direction toward the pump chamber 28 and pump fluid end 22 and away from pump power end 12 (as indicated by arrow 117), and the discharge valve of discharge valve assembly 72 is open and the suction valve of suction valve assembly 56 is closed (e.g., again either due to fluid flow and/or other biasing means of valve control), such that fluid is pumped out of pump chamber 28 via discharge chamber 53 and discharge outlet 54.

A pump 10 of this disclosure can comprise one or more access ports. For example, with reference to the cross-bore fluid end body 8 embodiment of FIG. 2, a front access port 30A can be located on a front S1 of the pump fluid end 22 opposite a back S2 of the pump fluid end 22, wherein the back S2 of the pump fluid end is proximal the pump power end 12, upon integration therewith via integration section 11. A top access port 30B can be located on a top S3 of the pump fluid end 22 opposite a bottom S4 of the pump fluid end 22, wherein the top S1 of the pump fluid end 22 is above central axis 17 and the bottom S4 of the pump fluid end 22 is below central axis 17. With reference to the concentric fluid end body 8 embodiment of FIG. 3, a front access port 30A can be located on a front S1 of the pump fluid end 22 opposite a back S2 of the pump fluid end 22, wherein the back S2 of the pump fluid end is proximal the pump power end 12, upon integration therewith via integration section 11. Locations described as front S1, back S2, top S3, and bottom S4 are further described with reference to the x-y-z coordinate system shown in FIG. 1 and further can be relative to a surface (e.g., a trailer bed, the ground, a platform, etc.) upon which the pump 10 is located, a bottom S4 of the pump fluid end being proximal the surface (e.g., trailer bed) upon which the pump 10 is located. Generally, due to size and positioning of pump 10, the front S1 and top S3 of the pump fluid end 22 are more easily accessible than a back S2 or bottom S4 thereof. In a similar manner, a front of pump 10 is distal the pump power end 12 and a back of the pump 10 is distal the pump fluid end 22. The integration section 11 can be positioned in a space between the pump fluid end 22 and the pump power end 12, and can be safeguarded (e.g., from personnel) via a cover 15.

In embodiments, a pump fluid end 22 and pump 10 of this disclosure comprise at least one access port located on a side of the discharge valve assembly 72 opposite the suction valve assembly 56. For example, in the cross-bore pump fluid end 22 embodiment of FIG. 2, top access port 30B is located on a side (e.g., top side) of discharge valve assembly 72 opposite suction valve assembly 56, while in the concentric bore pump fluid end 22 embodiment of FIG. 3, front access port 30A is located on a side (e.g., front side) of discharge valve assembly 72 opposite suction valve assembly 56.

In embodiments, one or more seals 29 (e.g., "o-ring" seals, packing seals, or the like), also referred to herein as 'primary' reciprocating element packing 29 may be arranged around the reciprocating element 18 to provide sealing between the outer walls of the reciprocating element 18 and the inner walls 26 defining at least a portion of the reciprocating element bore 24. In some concentric bore fluid end designs, a second set of seals (also referred to herein as 'secondary' reciprocating element packing; not shown in the Figures) may be fixedly arranged around the reciprocating element 18 to provide sealing between the outer walls of the reciprocating element 18 and the inner walls of a low-pressure cylinder that defines the low pressure chamber described hereinabove (e.g., wherein the secondary packing is farther back along the x-axis and delineates a back end of the low pressure chamber that extends from the primary packing 29 to the secondary packing). Skilled artisans will recognize that the seals may comprise any suitable type of seals, and the selection of seals may depend on various factors e.g., fluid, temperature, pressure, etc.

While the foregoing discussion focused on a pump fluid end 22 comprising a single reciprocating element 18 disposed in a single reciprocating element bore 24, it is to be understood that the pump fluid end 22 may include any suitable number of reciprocating elements. As discussed further below, for example, the pump 10 may comprise a plurality of reciprocating elements 18 and associated reciprocating element bores 24 arranged in parallel and spaced apart along the z-axis of FIG. 1 (or another arrangement such as a V block or radial arrangement). In such a multi-bore pump, each reciprocating element bore may be associated with a respective reciprocating element and crank arm, and a single common crankshaft may drive each of the plurality of reciprocating elements and crank arms. Alternatively, a multi-bore pump may include multiple crankshafts, such that each crankshaft may drive a corresponding reciprocating element. Furthermore, the pump 10 may be implemented as any suitable type of multi-bore pump. In a non-limiting example, the pump 10 may comprise a Triplex pump having three reciprocating elements 18 (e.g., plungers or pistons) and associated reciprocating element bores 24, discharge valve assemblies 72 and suction valve assemblies 56, or a Quintuplex pump having five reciprocating elements 18 and five associated reciprocating element bores 24, discharge valve assemblies 72 and suction valve assemblies 56.

Reciprocating element bore 24 can have an inner diameter slightly greater than the outer diameter of the reciprocating element 18, such that the reciprocating element 18 may sufficiently reciprocate within reciprocating element bore 24. In embodiments, the fluid end body 8 of pump fluid end 22 has a pressure rating ranging from about 100 psi to about 3000 psi, or from about 2000 psi to about 10,000 psi, from about 5000 psi to about 30,000 psi, or from about 3000 psi to about 50,000 psi or greater. The fluid end body 8 of pump fluid end 22 may be cast, forged or formed from any suitable materials, e.g., steel, metal alloys, or the like. Those versed in the art will recognize that the type and condition of material(s) suitable for the fluid end body 8 may be selected based on various factors. In a wellbore servicing operation, for example, the selection of a material may depend on flow rates, pressure rates, wellbore service fluid types (e.g., particulate type and/or concentration present in particle laden fluids such as fracturing fluids or drilling fluids, or fluids comprising cryogenic/foams), etc. Moreover, the fluid end body 8 (e.g., cylinder wall 26 defining at least a portion of reciprocating element bore 24 and/or pump chamber 28) may include protective coatings for preventing and/or resisting abrasion, erosion, and/or corrosion.

In embodiments, the cylindrical shape (e.g., providing cylindrical wall(s) 26) of the fluid end body 8 may be pre-stressed in an initial compression. Moreover, a high-pressure cylinder(s) providing the cylindrical shape (e.g., providing cylindrical wall(s) 26) may comprise one or more sleeves (e.g., heat-shrinkable sleeves). Additionally or alternatively, the high-pressure cylinder(s) may comprise one or more composite overwraps and/or concentric sleeves ("over-sleeves"), such that an outer wrap/sleeve pre-loads an inner wrap/sleeve. The overwraps and/or over-sleeves may be non-metallic (e.g., fiber windings) and/or constructed from relatively lightweight materials. Overwraps and/or over-sleeves may be added to increase fatigue strength and overall reinforcement of the components.

The cylinders and cylindrical-shaped components (e.g., providing cylindrical wall 26) associated with the pump fluid end body 8 of pump fluid end 22 may be held in place within the pump 10 using any appropriate technique. For example, components may be assembled and connected, e.g., bolted, welded, etc. Additionally or alternatively, cylinders may be press-fit into openings machined or cast into the pump fluid end 22 or other suitable portion of the pump 10. Such openings may be configured to accept and rigidly hold cylinders (e.g., having cylinder wall(s) 26 at least partially defining reciprocating element bore 24) in place so as to facilitate interaction of the reciprocating element 18 and other components associated with the pump 10.

In embodiments, the reciprocating element 18 comprises a plunger or a piston. While the reciprocating element 18 may be described herein with respect to embodiments comprising a plunger, it is to be understood that the reciprocating element 18 may comprise any suitable component for displacing fluid. In a non-limiting example, the reciprocating element 18 may be a piston. As those versed in the art will readily appreciate, a piston-type pump generally employs sealing elements (e.g., rings, packing, etc.) attached to the piston and movable therewith. In contrast, a plunger-type pump generally employs fixed or static seals (e.g., primary seal or packing 29) through which the plunger moves during each stroke (e.g., suction stroke or discharge stroke).

As skilled artisans will understand, the reciprocating element 18 may include any suitable size and/or shape for extending and retracting along a flow path within the pump fluid end 22. For instance, reciprocating element 18 may comprise a generally cylindrical shape, and may be sized such that the reciprocating element 18 can sufficiently slide against or otherwise interact with the inner cylinder wall 26. In embodiments, one or more additional components or mechanical linkages 4 (FIG. 4; e.g., clamps, adapters, extensions, etc.) may be used to couple the reciprocating element 18 to the pump power end 12 (e.g., to a pushrod 30).

In some embodiments (e.g., cross-bore pump fluid end 22 embodiments such as FIG. 2), the reciprocating element may be substantially solid and/or impermeable (e.g., not hollow). In alternative embodiments (e.g., concentric bore pump fluid end 22 embodiment such as FIG. 3), the reciprocating element 18 comprises a peripheral wall defining a hollow body. Additionally (e.g., concentric bore pump fluid end 22 embodiments such as FIG. 3), a portion of the peripheral wall of reciprocating element 18 may be generally permeable or may include an input through which fluid may enter the hollow body and an output through which fluid may exit the hollow body. Furthermore, while the reciprocating element 18 may, in embodiments, define a substantially hollow interior and include a ported body, a base of the reciprocating element 18 proximal the pump power end, when assembled, may be substantially solid and/or impermeable (e.g., a plunger having both a hollow portion and a solid portion).

The reciprocating element 18 comprises a front or free end 60. In embodiments comprising concentric bore pump fluid end designs 22 such as shown in FIG. 3, the reciprocating element 18 can contain or at least partially contain the suction valve assembly 56. In one aspect, the suction valve assembly 56 is at least partially disposed within the reciprocating element 18 at or proximate to the front end 60 thereof. At an opposite or tail end 62 (also referred to as back or tail end 62) of the reciprocating element 18, the reciprocating element 18 may include a base coupled to the pump power end 12 of the pump 10 (e.g., via crank arm 20). In embodiments, the tail end 62 of the reciprocating element 18 is coupled to the pump power end 12 outside of pump fluid end 22, e.g., within integration section 11.

As noted above, pump fluid end 22 contains a suction valve assembly 56. Suction valve assembly 56 may alternately open or close to permit or prevent fluid flow. Skilled artisans will understand that the suction valve assembly 56 may be of any suitable type or configuration (e.g., gravity- or spring-biased, flow activated, etc.). Those versed in the art will understand that the suction valve assembly 56 may be disposed within the pump fluid end 22 at any suitable location therein. For instance, the suction valve assembly 56 may be disposed within the bore 25 below central axis 17 of the pump fluid end 22, in cross-bore pump fluid end 22 designs such as FIG. 2, such that a suction valve body of the suction valve assembly 56 moves away from a suction valve seat within the a suction valve seat housing of reciprocating element 18 when the suction valve assembly 56 is in an open configuration and toward the suction valve seat when the suction valve assembly 56 is in a closed configuration. The suction valve assembly 56 may be disposed within reciprocating element bore 24 and at least partially within reciprocating element 18 in concentric bore pump fluid end 22 designs such as FIG. 3, such that a suction valve body of the suction valve assembly 56 moves away from a suction valve seat within the a suction valve seat housing of reciprocating element 18 when the suction valve assembly 56 is in an open configuration and toward the suction valve seat when the suction valve assembly 56 is in a closed configuration.

Pump 10 comprises a discharge valve assembly 72 for controlling the output of fluid through discharge chamber 53 and discharge outlet 54. Analogous to the suction valve assembly 56, the discharge valve assembly 72 may alternately open or close to permit or prevent fluid flow. Those versed in the art will understand that the discharge valve assembly 72 may be disposed within the pump chamber at any suitable location therein. For instance, the discharge valve assembly 72 may be disposed within the bore 25 proximal the top S3 of the pump fluid end 22, in cross-bore pump fluid end 22 designs such as FIG. 2, such that a discharge valve body of the discharge valve assembly 72 moves toward the discharge chamber 53 when the discharge valve assembly 72 is in an open configuration and away from the discharge chamber 53 when the discharge valve assembly 72 is in a closed configuration. The discharge valve assembly 72 may be disposed proximal the front S1 of bore 24 of the pump fluid end 22 (e.g., at least partially within discharge chamber 53 and/or pump chamber 28) in concentric bore pump fluid end 22 designs such as FIG. 3, such that a discharge valve body of the discharge valve assembly 72 moves toward the discharge chamber 53 when the discharge valve assembly 72 is in an open configuration and away from the discharge chamber 53 when the discharge valve assembly 72 is in a closed configuration. In addition, the discharge valve assembly 72 may be co-axially aligned with the suction valve assembly 56 (e.g., along central axis 17 in concentric bore pump fluid end 22 configurations such as FIG. 3 or along central axis 27 of bore 25 perpendicular to central axis 17 in cross-bore pump fluid end 22 configurations such as FIG. 2), and, in concentric bore pump fluid end 22 configurations such as FIG. 3, the suction valve assembly 56 and the discharge valve assembly 72 may be coaxially aligned with the reciprocating element 18 (e.g., along central axis 17).

Further, the suction valve assembly 56 and the discharge valve assembly 72 can comprise any suitable mechanism for opening and closing valves. For example, the suction valve assembly 56 and the discharge valve assembly 72 can comprise a suction valve spring and a discharge valve spring, respectively. Additionally, any suitable structure (e.g., valve assembly comprising sealing rings, stems, poppets, etc.) and/or components may be employed suitable means for retaining the components of the suction valve assembly 56 and the components of the discharge valve assembly 72 within the pump fluid end 22 may be employed.

The fluid inlet 38 may be arranged within any suitable portion of the pump fluid end 22 and configured to supply fluid to the pump in any direction and/or angle. Moreover, the pump fluid end 22 may comprise and/or be coupled to any suitable conduit (e.g., pipe, tubing, or the like) through which a fluid source may supply fluid to the fluid inlet 38. The pump 10 may comprise and/or be coupled to any suitable fluid source for supplying fluid to the pump via the fluid inlet 38. In embodiments, the pump 10 may also comprise and/or be coupled to a pressure source such as a boost pump (e.g., a suction boost pump) fluidly connected to the pump 10 (e.g., via inlet 38) and operable to increase or "boost" the pressure of fluid introduced to pump 10 via fluid inlet 38. A boost pump may comprise any suitable type including, but not limited to, a centrifugal pump, a gear pump, a screw pump, a roller pump, a scroll pump, a piston/plunger pump, or any combination thereof. For instance, the pump 10 may comprise and/or be coupled to a boost pump known to operate efficiently in high-volume operations and/or may allow the pumping rate therefrom to be adjusted. Skilled artisans will readily appreciate that the amount of added pressure may depend and/or vary based on factors such as operating conditions, application requirements, etc. In one aspect, the boost pump may have an outlet pressure greater than or equal to about 70 psi, about 80 psi, or about 110 psi, providing fluid to the suction side of pump 10 at about said pressures. Additionally or alternatively, the boost pump may have a flow rate of greater than or equal to about 80 BPM, about 70 BPM, and/or about 50 BPM.

As noted hereinabove, the pump 10 may be implemented as a multi-cylinder pump comprising multiple cylindrical reciprocating element bores 24 and corresponding components. In embodiments, the pump 10 is a Triplex pump in which the pump fluid end 22 comprises three reciprocating assemblies, each reciprocating assembly comprising a suction valve assembly 56, a discharge valve assembly 72, a pump chamber 28, a fluid inlet 38, a discharge outlet 54, and a reciprocating element bore 24 within which a corresponding reciprocating element 18 reciprocates during operation of the pump 10 via connection therewith to a (e.g., common) pump power end 12. In embodiments, the pump 10 is a Quintuplex pump in which the pump fluid end 22 comprises five reciprocating assemblies. In a non-limiting example, the pump 10 may be a Q-10™ Quintuplex Pump or an HT-400™ Triplex Pump, produced by Halliburton Energy Services, Inc.

In embodiments, the pump fluid end 22 may comprise an external manifold (e.g., a suction header) for feeding fluid to the multiple reciprocating assemblies via any suitable inlet(s). Additionally or alternatively, the pump fluid end 22 may comprise separate conduits such as hoses fluidly connected to separate inlets for inputting fluid to each reciprocating assembly. Of course, numerous other variations may be similarly employed, and therefore, fall within the scope of the present disclosure.

Those skilled in the art will understand that the reciprocating elements of each of the reciprocating assemblies may be operatively connected to the pump power end 12 of the pump 10 according to any suitable manner. For instance, separate connectors (e.g., cranks arms/connecting rods 20, one or more additional components or mechanical linkages 4, pushrods 30, etc.) associated with the pump power end 12 may be coupled to each reciprocating element body or tail end 62. The pump 10 may employ a common crankshaft (e.g., crankshaft 16) or separate crankshafts to drive the multiple reciprocating elements.

As previously discussed, the multiple reciprocating elements may receive a supply of fluid from any suitable fluid source, which may be configured to provide a constant fluid supply. Additionally or alternatively, the pressure of supplied fluid may be increased by adding pressure (e.g., boost pressure) as described previously. In embodiments, the fluid inlet(s) 38 receive a supply of pressurized fluid comprising a pressure ranging from about 30 psi to about 300 psi.

Additionally or alternatively, the one or more discharge outlet(s) 54 may be fluidly connected to a common collection point such as a sump or distribution manifold, which may be configured to collect fluids flowing out of the fluid outlet(s) 54, or another cylinder bank and/or one or more additional pumps.

During pumping, the multiple reciprocating elements 18 will perform forward and returns strokes similarly, as described hereinabove. In embodiments, the multiple reciprocating elements 18 can be angularly offset to ensure that no two reciprocating elements are located at the same position along their respective stroke paths (i.e., the plungers are "out of phase"). For example, the reciprocating elements may be angularly distributed to have a certain offset (e.g., 120 degrees of separation in a Triplex pump) to minimize undesirable effects that may result from multiple reciprocating elements of a single pump simultaneously producing pressure pulses. The position of a reciprocating element is generally based on the number of degrees a pump crankshaft (e.g., crankshaft 16) has rotated from a bottom dead center (BDC) position. The BDC position corresponds to the position of a fully retracted reciprocating element at zero velocity, e.g., just prior to a reciprocating element moving (i.e., in a direction indicated by arrow 117 in FIGS. 2 and 3) forward in its cylinder. A top dead center position corresponds to the position of a fully extended reciprocating element at zero velocity, e.g., just prior to a reciprocating element moving backward (i.e., in a direction indicated by arrow 116 in FIGS. 2 and 3) in its cylinder.

As described above, each reciprocating element 18 is operable to draw in fluid during a suction (backward or return) stroke and discharge fluid during a discharge (forward) stroke. Skilled artisans will understand that the multiple reciprocating elements 18 may be angularly offset or phase-shifted to improve fluid intake for each reciprocating element 18. For instance, a phase degree offset (at 360 degrees divided by the number of reciprocating elements) may be employed to ensure the multiple reciprocating elements 18 receive fluid and/or a certain quantity of fluid at all times of operation. In one implementation, the three reciprocating elements 18 of a Triplex pump may be phase-shifted by a 120-degree offset. Accordingly, when one reciprocating element 18 is at its maximum forward stroke position, a second reciprocating element 18 will be 60 degrees through its discharge stroke from BDC, and a third reciprocating element will be 120 degrees through its suction stroke from top dead center (TDC).

Figure 5A:
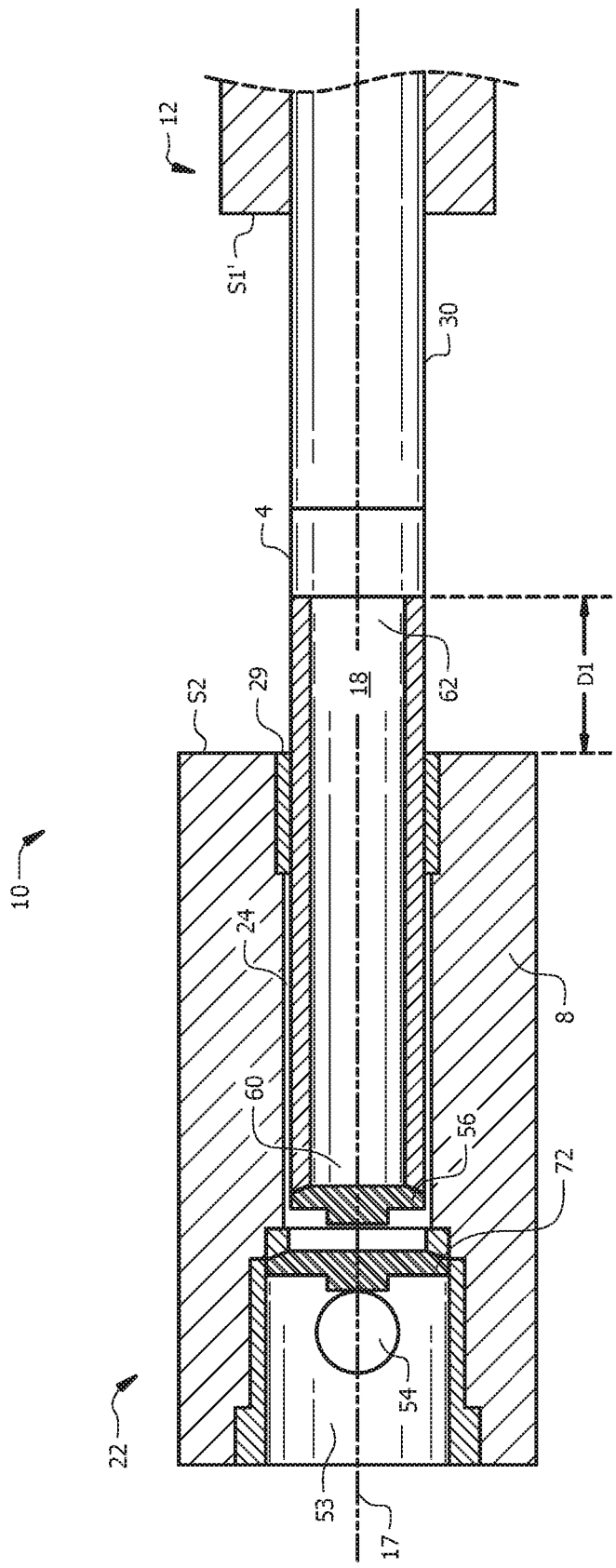
FIG. 5A is a cut-away illustration of an embodiment of a pump, with a crankshaft at top dead center (TDC), according to embodiments of the present disclosure.
Figure 5B:
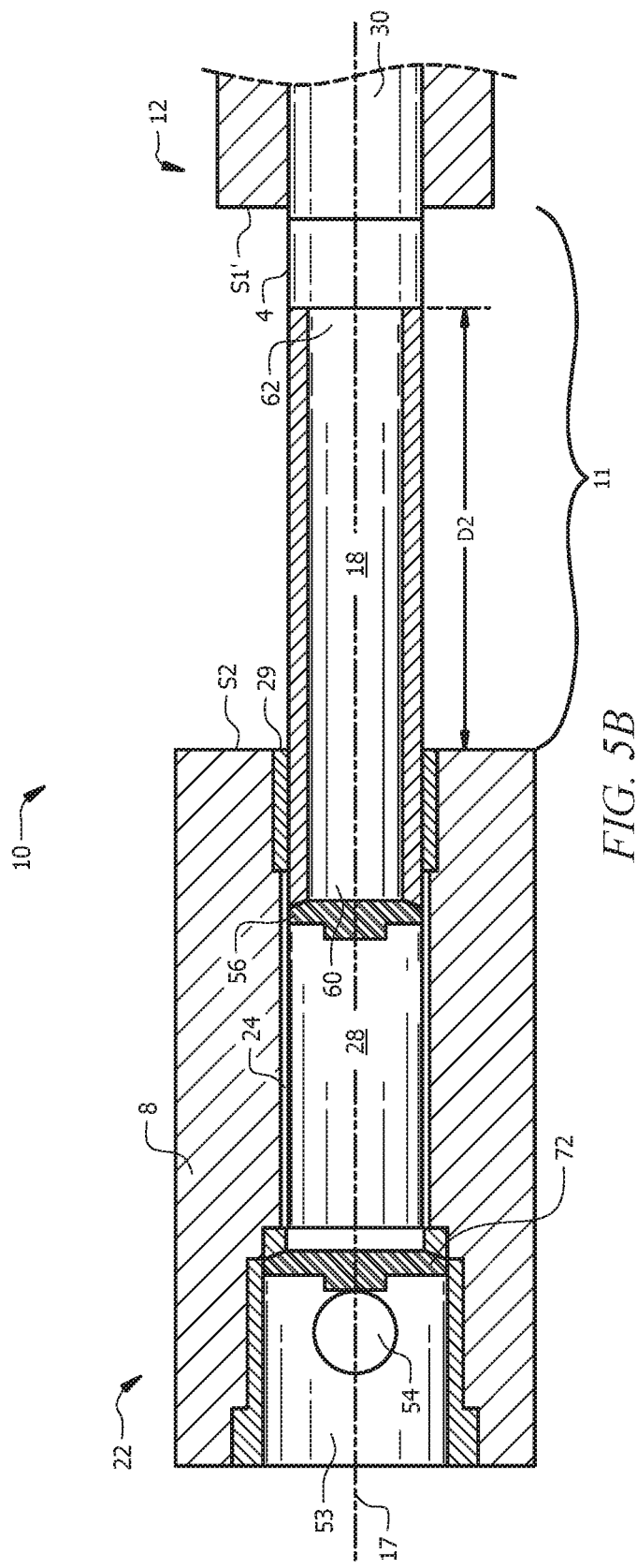
FIG. 5B is a cut-away illustration of a pump, with a crankshaft at bottom dead center (BDC), according to embodiments of the present disclosure.

FIG. 5A is a cut-away illustration of an embodiment of a pump 10, with a crankshaft 16 of pump power end 12 at top dead center (TDC), according to embodiments of the present disclosure. FIG. 5B is a cut-away illustration of the pump 10 of FIG. 5A with crankshaft 16 at bottom dead center (BDC). As can be seen in FIG. 5A, a minimum spacing distance D1 exists between back S2 of pump fluid end 22 and a closest component connected with pump power end 12, after reciprocating element 18 has been disconnected therefrom, when the crankshaft 16 (FIG. 4) is at TDC. The closest component can be a component of the one or more mechanical linkages 4 directly connected with reciprocating element 18 during operation of pump 10 (e.g., a reciprocating element adapter) or can be a front S1' of pump power end 12, if front S1' of pump power end 12 is axially closer to back S2 of pump fluid end 22 when pump 10 is stopped. As utilized herein, "spacing distance" is generically used to indicate the distance between back S2 of pump fluid end 22 and the closest component (e.g., the closest of the one or more mechanical linkages 4 operatively connecting reciprocating element 18 with pump power end 12 or the front S1' of pump power end 12, whichever is closer to pump fluid end 22) of pump power end 12 proximate pump fluid end 22 when pump 10 is stopped and reciprocating element 18 is decoupled from pump fluid end 12. As shown in FIG. 5B, when crankshaft 16 is at BDC, a maximum spacing distance D2 exists between back S2 of pump fluid end 22 and the closest component (e.g., the one or more mechanical linkages 4 most proximate pump fluid end 22 or, in cases wherein the component of the one or more mechanical linkages 4 most proximate pump fluid end 22 at BDC is within pump power end 12, the front S1' of pump power end 12). Although the one or more mechanical linkages 4 as described hereinbelow comprises an adapter 40, the minimum spacing distance D1 can be a distance between back S2 of pump fluid end 22 and whatever component of the one or more mechanical linkages 4 is closest to pump fluid end 22 (e.g., the component to which tail end 62 of reciprocating element 18 is directly coupled).

During operation of pump 10, TDC is the point at which reciprocating element 18 is fully extended, such as depicted in FIG. 5A, while BDC is the point at which the reciprocating element 18 is fully retracted, such as depicted in FIG. 5B. Additionally, although depicted as a concentric bore pump fluid end 22 (such as described hereinabove with reference to FIG. 3) in the embodiment of FIG. 5A and FIG. 5B, pump fluid end 22 can be a cross-bore pump fluid end (as described hereinabove with reference to FIG. 2), in embodiments.

In embodiments, the minimum spacing distance D1 is equal to or greater than 0.5, 1, 1.5, 2, or 2.5 inches and less than or equal to about 3, 4, 5, 6, 7, 8, 9, or 10 inches (7.6, 10.2, 12.7, 15.2, 17.8, 20.3, 22.9, or 25.4 cm), or is in a range of from about 3 to about 10 inches (7.6 to about 25.4 cm), from about 4 to about 9 inches (10.2 to about 22.9 cm), or from about 3 to about 6 inches (7.6 to about 15.2 cm), or is equal to about 3, 3.5, 4, 4.5, 5, 5.5, 6, 6.5, 7, 7.5, 8, 8.5, 9, 9.5, or 10 inches.

Figure 6:
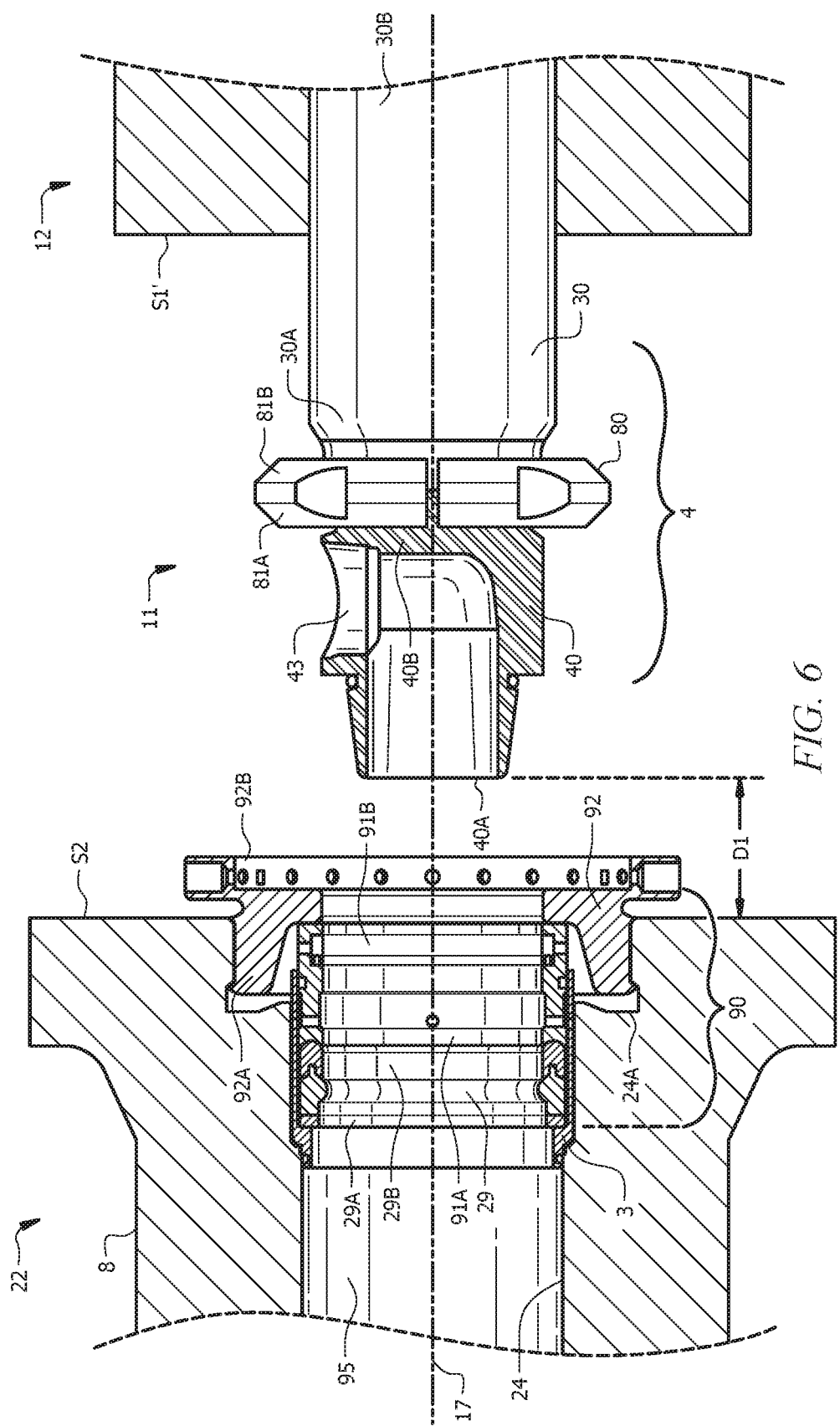
FIG. 6 is a cut-away illustration of a pump comprising a packing assembly of this disclosure, with a crankshaft at top dead center (TDC), according to embodiments of the present disclosure.

Herein disclosed are a packing assembly 90, a pump fluid end 22 comprising the packing assembly 90, and a pump 10 comprising the pump fluid end 22 comprising the packing assembly 90. FIG. 6 is a cut-away illustration of a pump 10 comprising a packing assembly 90 of this disclosure in pump fluid end 22, with a crankshaft 16 (FIG. 4) at top dead center (TDC), according to embodiments of the present disclosure. Packing assembly 90 comprises a packing screw 92, a packing carrier 91, and a packing 29. Packing screw 92, packing carrier 91, and packing 29 are cylindrical and have a width measured an axial distance along a central axis thereof (i.e., central axis 17A of packing screw 92 (FIG. 7A), central axis 17B of packing carrier 91 (FIG. 7B), and central axis 17C of packing 29 (FIG. 7C)) that is less than the minimum spacing distance D1 of pump 10 comprising the pump fluid end 22 and a pump power end 12. When packing assembly 90 is assembled in pump fluid end 22, central axis 17A of packing screw 92, central axis 17B of packing carrier 91, and central axis 17C of packing 29 are coincident (also referred to as coaxial) with central axis 17 of reciprocating element bore 24.

As described hereinabove with reference to FIGS. 1-4, pump fluid end 22 comprises a reciprocating element bore 24 in which a reciprocating element 18 can be reciprocated via the pump power end 12 via connection of a tail end 62 of the reciprocating element 18 to a pushrod 30 and crankshaft 16 of the pump power end 12, via one or more mechanical linkages 4. In the embodiment of FIG. 6, the one or more mechanical linkages 4 (FIG. 4) comprise a reciprocating element adapter 40 (referred to hereinafter as an 'adapter', for simplicity). Thus, in the embodiment of FIG. 6, the minimum spacing distance D1 is an axial distance measured along the central axis 17 between back S2 of the pump fluid end 22 and a front end 40A of the reciprocating element adapter 40 when the crankshaft 16 of the pump power end 22 is at top dead center (TDC). Adapter 40 is configured to couple reciprocating element 18 with pushrod 30 upon rotation of crankshaft 16. When assembled, packing assembly 90 can be positioned generally where packing 29 is depicted in FIGS. 2-3 and FIGS. 5A-5B.

Packing screw 92 is designed such that, once packing 29 and packing carrier 91 are inserted into reciprocating element bore 24 of pump fluid end 22, packing screw 92 can be inserted into reciprocating element bore 24 and coupled (e.g., threaded together) with pump fluid body 8 of pump fluid end 22, such that packing screw 92 retains packing carrier 91 and packing screw 29 in pump fluid end 22 during pump operation.

In the embodiments of FIG. 6, pump 10 further comprises a cylindrical sleeve 95 (as described hereinabove) within reciprocating element bore 24. Packing 29, packing carrier 91, packing screw 92, or a combination thereof can be located within such a sleeve 95 toward the back S2 of the pump fluid end 22. In some such embodiments, pump fluid end 22 is a concentric bore pump fluid end 22, such as described hereinabove with reference to the embodiment of FIG. 3. Alternatively, packing 29, packing carrier 91, packing screw 92, or a combination thereof can be located within reciprocating element bore 24 toward the back S2 of the pump fluid end 22, the reciprocating element bore 24 containing no sleeve 95. In some such embodiments, pump fluid end 22 is a cross-bore pump fluid end 22, such as described hereinabove with reference to the embodiment of FIG. 2.

With respect to a front side and a back side of packing 29, packing carrier 91, and packing screw 92, the front side is axially distal the pump power end 12 (i.e., is farther along central axis 17 from pump power end 12) relative to the back side thereof, which is axially proximate pump power end 12 (i.e., is closer along central axis 17 to pump power end 12 than the front side). Upon assembly within pump fluid end 22, a front side 29A of packing 29 is distal pump power end 12, a back side 29B of the packing 29 axially proximate the pump power end 12 contacts a front side 91A of the packing carrier 91 axially distal the pump power end 21, and at least a portion of a front side 92A of the packing screw axially distal the pump power end 12 contacts a back side 91B of the packing carrier 91 axially proximate the pump power end 12.

Figure 7A:
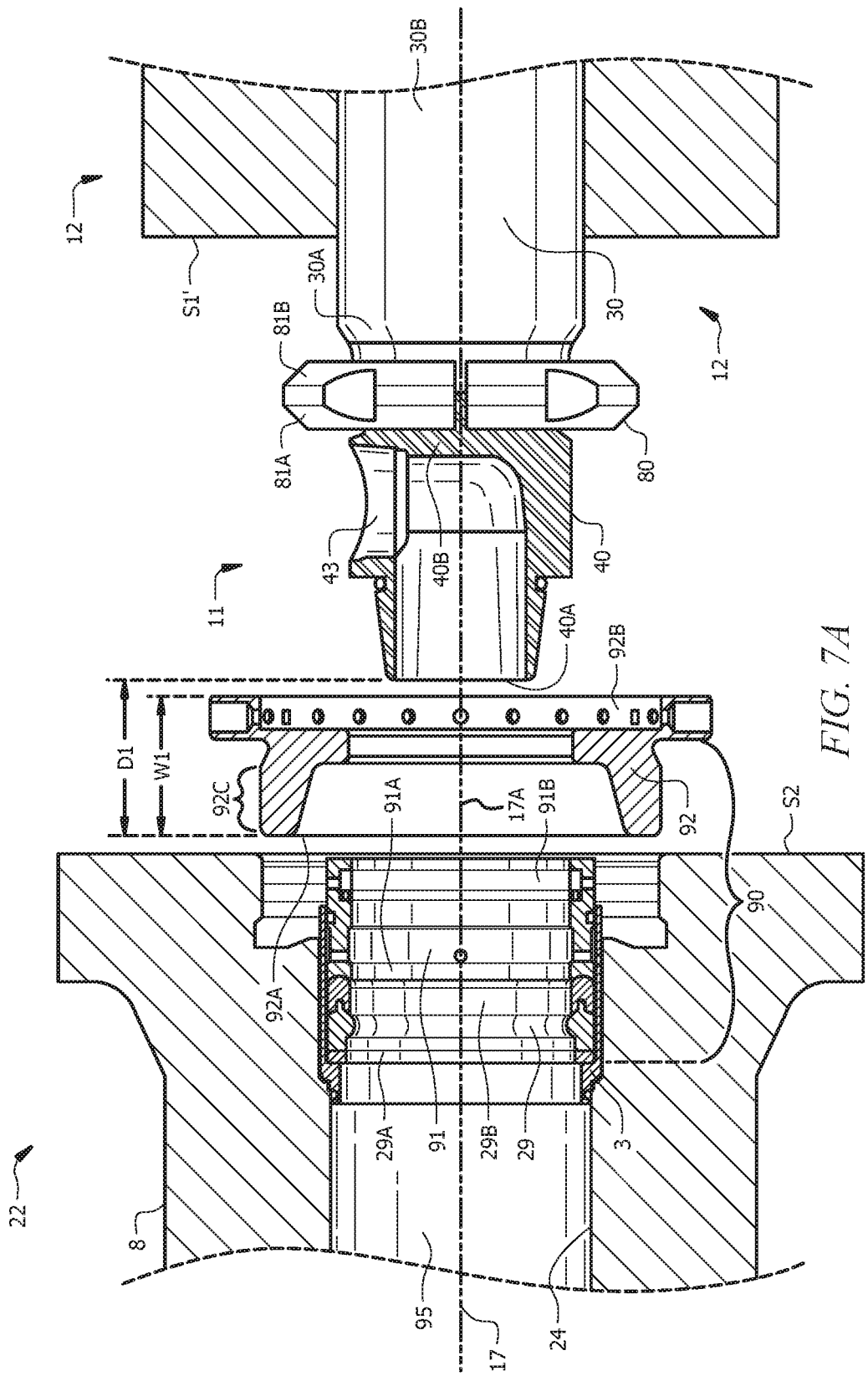
FIG. 7A is a cut-away illustration of a pump comprising the packing assembly of FIG. 6 with the crankshaft at top dead center (TDC), and a packing screw of the packing assembly being removed.

FIG. 7A is a cut-away illustration of pump 10 comprising the packing assembly 90 of FIG. 6 with the crankshaft 16 (FIG. 4) at TDC and from which reciprocating element 18 has been removed, depicting removal of packing screw 92 of packing assembly 90 from back S2 of pump fluid end 22. As shown in FIG. 7A, packing screw 92 has a width W1 that is less than the minimum spacing distance D1, such that packing screw 92 can be removed from pump 10, even when crankshaft 16 (FIG. 4) is at TDC, because width W1 thereof is less than the minimum spacing distance D1. In embodiments, packing screw 92 comprises threads on at least a portion 92C of an outside diameter thereof, or other features, whereby the packing screw 92 can be threadably, or otherwise, connected with a mating thread on a portion 24A of an inside diameter of the reciprocating element bore 24 (and/or a sleeve 95 therein), such that, upon assembly within pump fluid end 22, the packing screw 92 retains the packing 29 and the packing carrier 91 in the pump fluid end 22.

Figure 7B:
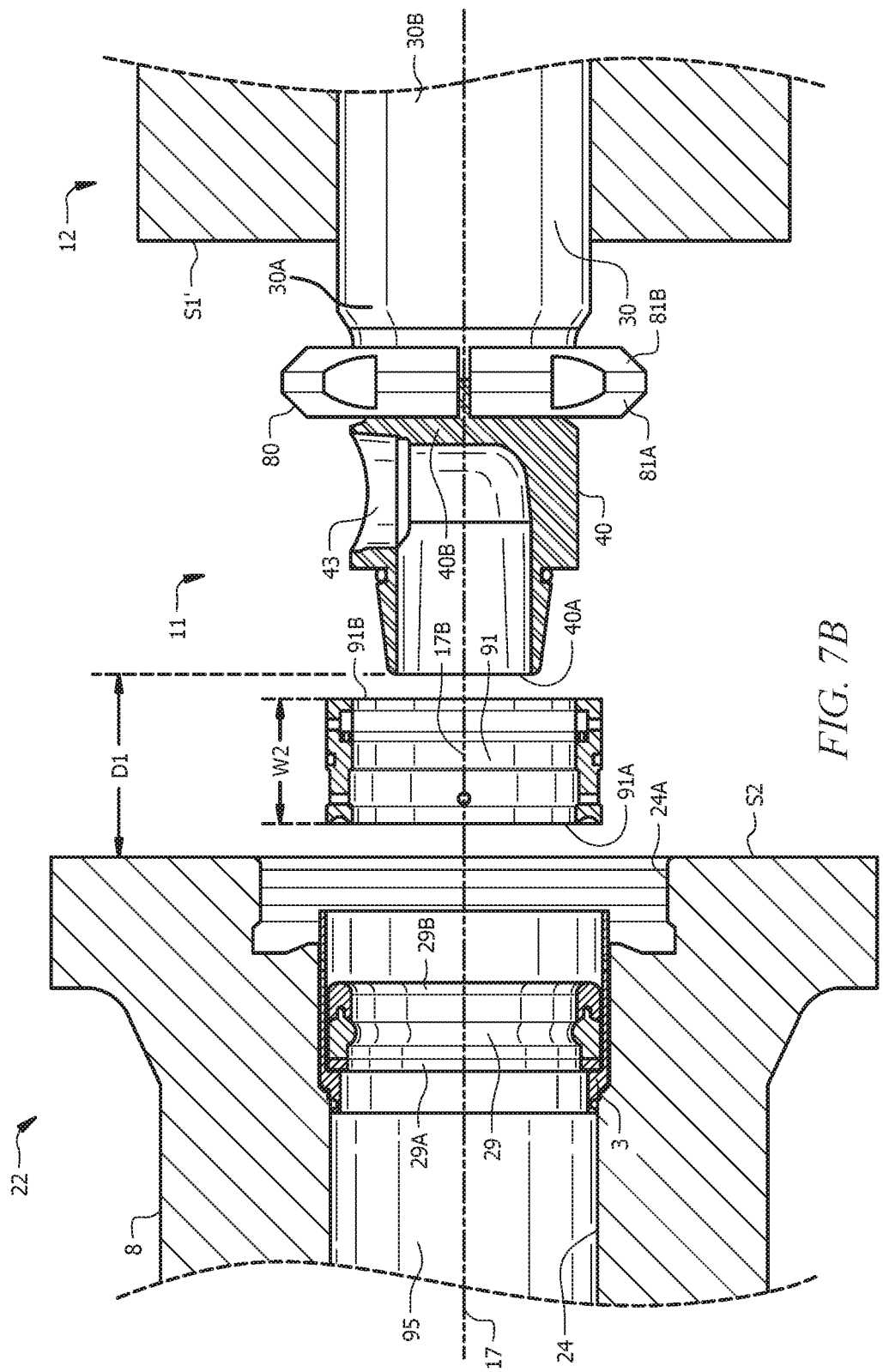
FIG. 7B is a cut-away illustration of a pump comprising the packing assembly of FIG. 6 with the crankshaft at top dead center (TDC), and a packing carrier of the packing assembly being removed.

FIG. 7B is a cut-away illustration of a pump 10 comprising the packing assembly 90 of FIG. 6 with the crankshaft 16 (FIG. 4) at TDC and from which reciprocating element 18 has been removed, depicting removal of packing carrier 91 of the packing assembly 90 from back S2 of pump fluid end 22. As shown in FIG. 7B, packing carrier 91 has a width W2 that is less than the minimum spacing distance D1, such that packing carrier 91 can be removed from pump 10, even when crankshaft 16 (FIG. 4) is at TDC, because width W2 thereof is less than the minimum spacing distance D1.

Packing 29 can be any suitable packing known to those of skill in the art and with the help of this disclosure. In embodiments, packing 29 comprises an elastomeric material. In embodiments, packing 29 comprises a plurality of rings of elastomeric material. In embodiments, packing 29 comprises one, two, three, four, or more of rings of elastomeric material.

Figure 7C:
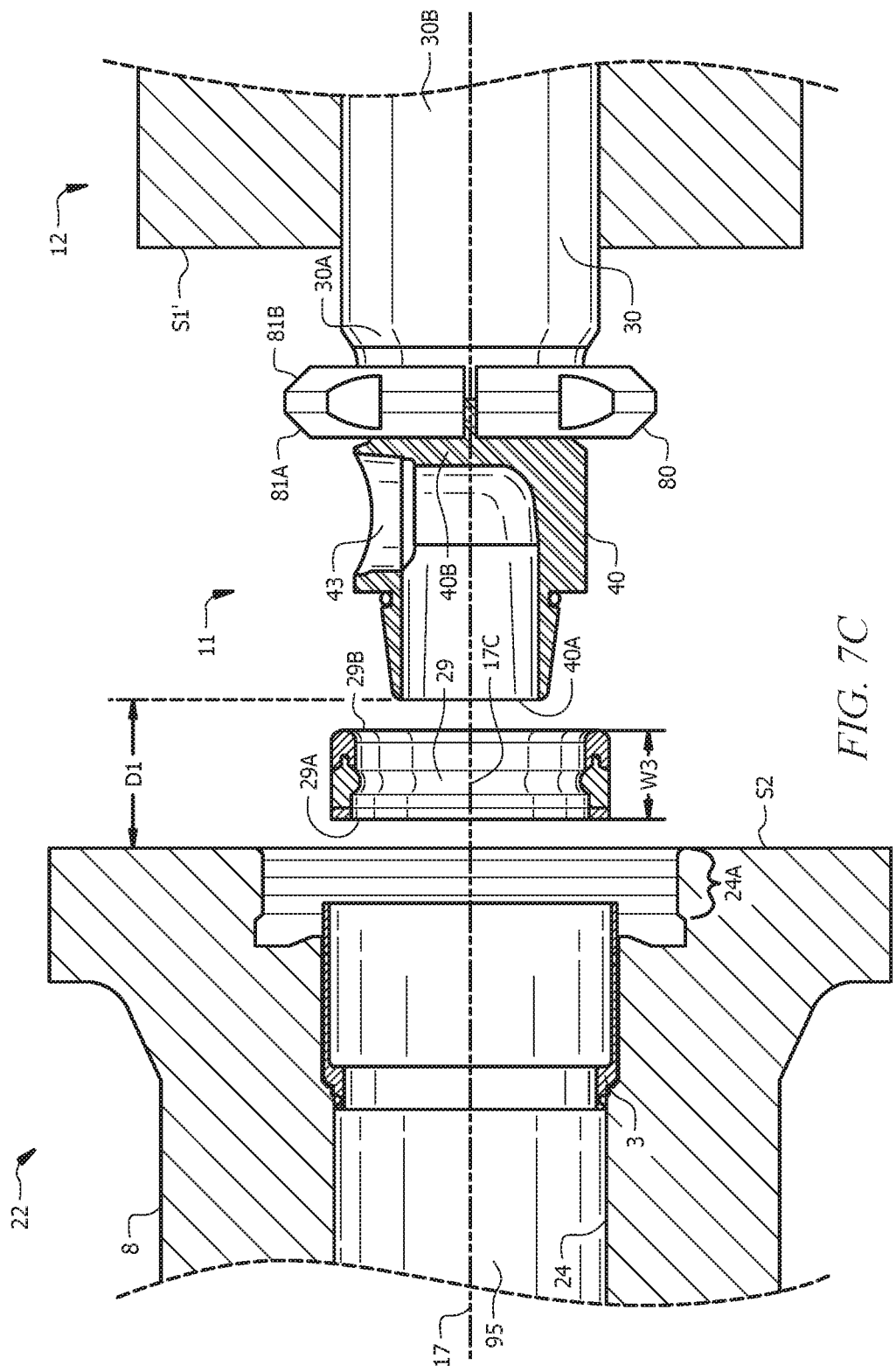
FIG. 7C is a cut-away illustration of a pump comprising the packing assembly of FIG. 6 with the crankshaft at top dead center (TDC), and a packing of the packing assembly being removed.

FIG. 7C is a cut-away illustration of a pump 10 comprising the packing assembly 90 of FIG. 6 with the crankshaft 16 (FIG. 4) at TDC and from which reciprocating element 18 has been removed, depicting removal of packing 29 of the packing assembly 90 from back S2 of pump fluid end 22. As shown in FIG. 7C, packing 29 has a width W3 that is less than the minimum spacing distance D1, such that packing 29 can be removed from pump 10, even when crankshaft 16 (FIG. 4) is at TDC, because width W3 thereof is less than the minimum spacing distance D1.

As noted above, a pump fluid end 22 of this disclosure comprising packing assembly 90 can be a concentric bore pump fluid end 22 (e.g., as described hereinabove with reference to FIG. 3) or a cross-bore pump fluid end 22 (e.g., as described hereinabove with regard to FIG. 2). As noted hereinabove, the pump fluid end 22 can comprise a suction valve assembly 56 and a discharge valve assembly 72. In embodiments, suction valve assembly 56 and/or discharge valve assembly 72 comprises a valve assembly having a valve guide, as described, for example, in U.S. Patent Application Ser. No. 16/411,910, filed May 14, 2019, and is entitled "Valve Assembly for a Fluid End with Limited Access", the disclosure of which is hereby incorporated herein in its entirety for purposes not contrary to this disclosure. In embodiments, a valve seat of suction valve assembly 56 and/or discharge valve assembly 72 is a valve seat with supplemental retention, as described, for example, in U.S. Patent Application Ser. No. 16/411,898, filed May 14, 2019, and is entitled "Pump Valve Seat with Supplemental Retention", the disclosure of which is hereby incorporated herein in its entirety for purposes not contrary to this disclosure. In embodiments, pump fluid end 22 comprises an easy access suction valve, as described, for example, in U.S. Patent Application Ser. No. 16/411,891, filed May 14, 2019, and is entitled "Pump Fluid End with Easy Access Suction Valve", the disclosure of which is hereby incorporated herein in its entirety for purposes not contrary to this disclosure.

In embodiments, a pump fluid end 22 of this disclosure comprising packing assembly 90 is a cross-bore pump fluid end 22. In such embodiments, the cross-bore pump fluid end 22 further comprises a discharge valve assembly 72 (FIG. 2) and a suction valve assembly 56 (FIG. 2), with the discharge valve assembly 72 located within cross bore 25 on one side of central axis 17 of reciprocating element bore 24, and the suction valve assembly 56 located within cross bore 25 on an opposite side of central axis 17 from discharge valve assembly 72.

In embodiments, a pump fluid end 22 of this disclosure comprising packing assembly 90 is a concentric bore pump fluid end 22. In such embodiments, the concentric bore pump fluid end 22 further comprises a discharge valve assembly 72 (FIG. 3) and a suction valve assembly 56 (FIG. 3), with the discharge valve assembly 72 located on a side of the reciprocating element bore 24 distal the back S2 of pump fluid end 22, and the suction valve assembly 56 coupled with the reciprocating element 18. In some such embodiments, reciprocating element 18 comprises a hollow fluid passage, i.e., reciprocating element 18 is at least partly hollow.

In some concentric bore pump fluid end 22 embodiments, pump 10 comprises a flexible manifold, as described, for example, in U.S. Patent Application Ser. No. 16/411,901, filed May 14, 2019, and is entitled "Flexible Manifold for Reciprocating Pump", the disclosure of which is hereby incorporated herein in its entirety for purposes not contrary to this disclosure. In some such embodiments, reciprocating element adapter 40 comprises an inlet port 43 fluidly connected with one end of the flexible manifold, providing a fluid path from a stationary fluid manifold, through the flexible manifold, through inlet port 43 of reciprocating adapter 40 and reciprocating adapter 40, and thus through reciprocating element 18 and a suction valve assembly 56 associated with front end 60 thereof.

Figure 8:
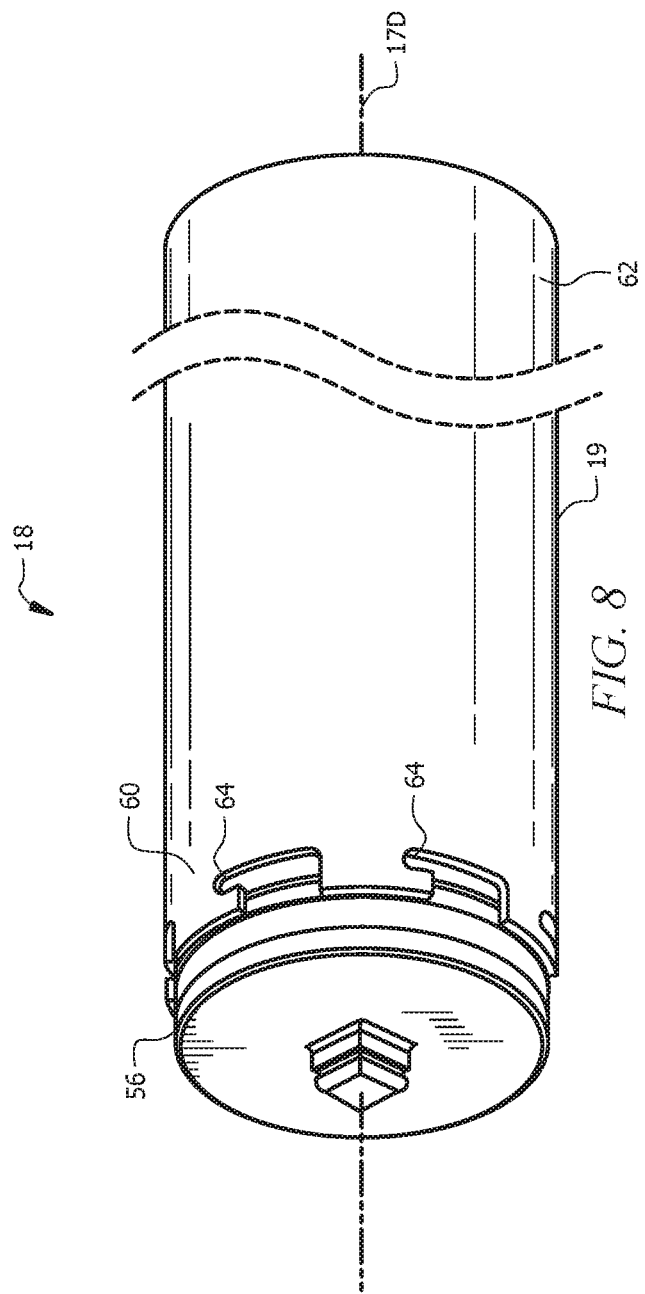
FIG. 8 is a schematic representation of an embodiment of a reciprocating element, according to embodiments of the present disclosure.

FIG. 8 is a schematic representation of an embodiment of a reciprocating element 18, according to embodiments of the present disclosure. In embodiments, such as the embodiment depicted in FIG. 8, a reciprocating element 18 of a pump fluid end 22 of this disclosure comprises a cylindrical body 19 (e.g., in embodiments, a solid and/or hollow cylindrical body) having a front end 60 axially opposite the tail end 62. The front end 60 is distal the back S2 of pump fluid end 22, and can comprise one or more tool engagement features 64 positioned about an outer circumference of the front end 60 of the reciprocating element 18. The one or more tool engagement features 64 can be adapted to engage a corresponding one or more reciprocating element engagement features of a reciprocating element end of a tool, such that the reciprocating element 18 can be rotated, pulled, and/or pushed within the reciprocating element bore 24 via the tool. In this manner, reciprocating element 18 can be removed from front S1 (e.g., via front access port 30A) of pump fluid end 22. A reciprocating element 18 comprising such tool engagement features 64 on front 60 thereof, whereby reciprocating element 18 can be removed from pump fluid end 22 by engaging a tool with the tool engagement features 64, is described, for example, in U.S. Patent Application Ser. No. 16/411,905, filed May 14, 2019, and is entitled "Pump Plunger with Wrench Features", the disclosure of which is hereby incorporated herein in its entirety for purposes not contrary to this disclosure.

In embodiments, the one or more tool engagement features 64 of the reciprocating element 18 comprise one or more slots. Without limitation, the one or more slots can have a shape comprising a J-shape, a T-shape, an L-shape, or a combination thereof. In embodiments, the reciprocating element engagement features of the tool are of complimentary size and shape to the tool engagement features 64 and are rotatably lockable with the tool engagement features 64 of the reciprocating element 18, whereby the reciprocating element 18 can be rotated and pulled and/or rotated and pushed via the tool. The reciprocating element engagement features of the tool can also be located about an outer circumference of a reciprocating element end of the tool on which the reciprocating element engagement features are disposed. The reciprocating element end of the tool can have an outer circumference substantially equal to the outer circumference of the reciprocating element 18, in embodiments.

The tool engagement features 64 and the corresponding reciprocating element engagement features of the tool are not particularly limited in shape or design, so long as they allow for engagement of the tool with reciprocating element 18 such that reciprocating element 18 can be rotated, pulled, and/or pushed within the reciprocating element bore 24 via the tool. Although depicted in the embodiment of FIG. 8 as a reciprocating element 18 for a concentric bore pump fluid end 22 (and comprising a suction valve assembly 56 coupled with front end 60 of reciprocating element 18), a reciprocating element 18 comprising such tool engagement features 64 whereby the reciprocating element 18 can be rotated, pulled, and/or pushed within reciprocating element bore 24 via corresponding rotating, pulling, and/or pushing on an end of the tool distal the reciprocating element end comprising the corresponding reciprocating element engagement features can be a reciprocating element 18 utilized in a cross-bore pump fluid end 22, in embodiments. As will be apparent to those of skill in the art, in the cross-bore pump fluid end 22 embodiments, reciprocating element 18 comprising the tool engagement features 64 would not be coupled with a suction valve assembly 56 as depicted in the embodiment of FIG. 8.

A packing assembly of this disclosure can be assembled in a pump fluid end 22 by inserting the packing 29 into reciprocating element bore 24 (or a sleeve inserted therein) from back S2 of pump fluid end 22, whereby the front side 29A of packing 29 is inserted first and, once the packing 29 is installed within pump fluid end 22, front side 29A of packing 29 is positioned axially distal the back S2 of pump fluid end 22 relative to the back side 29B of packing 29 (for example, abutting a shoulder or neck 3 of the reciprocating element bore 24 or a sleeve inserted therein). Next, packing carrier 91 can be inserted into reciprocating element bore 24 from back S2 of pump fluid end 22, whereby the front side 91A of packing carrier 91 is inserted first and positioned adjacent or flush with back side 29B of packing 29. Once packing carrier 91 is installed within pump fluid end 22, front side 91A of packing carrier 91 is positioned axially distal the back S2 of pump fluid end 22 relative to the back side 91B of packing carrier 91. Finally, packing screw 92 can be inserted into reciprocating element bore 24 from back S2 of pump fluid end 22, whereby the front side 92A of packing screw 92 is inserted first and positioned adjacent or flush with back side 91B of packing carrier 91. Once packing screw 92 is installed within pump fluid end 22, front side 92A of packing screw 92 is positioned axially distal the back S2 of pump fluid end 22 relative to the back side 92B of packing screw 92. In instances in which pump 10 stopped at TDC, packing 29, packing carrier 91, and packing screw 92 can be removed from reciprocating element bore 24 of pump fluid end 22 via the back S2 thereof in sequence, individually through the minimum spacing distance. In embodiments in which pump 10 stops such that the spacing distance between back S2 of pump fluid end 22 and the closest component of pump power end 12 (e.g., the front S1' of pump power end 12 or the component of the one or mechanical linkages 4 proximate pump fluid end 22 (e.g., front end 40A of adapter 40 proximate pump fluid end 22), whichever is closer to pump fluid end 22) allows, multiple components of packing assembly (e.g., any combination of the packing screw 92, the packing carrier 91, and the packing 29) can be inserted together from pump fluid end 22 via back S2 thereof. For example, should the pump (e.g., crankshaft 16 (FIG. 16) thereof) not be at TDC, and the spacing distance between the back S2 of pump fluid end 22 and the component of the one or more mechanical linkages 4 proximate pump fluid end 22 (or the front S1' (FIG. 5A and FIG. 5B) of pump power end 12, if the front S1' of pump power end 12 is closer to pump fluid end 22 than the component of the one or more mechanical linkages 4 that is axially closest to pump fluid end 22 when the pump 10 was stopped) allows, packing 29, packing carrier 91, and/or packing screw 92 can be inserted into reciprocating element bore 24 as a unit, with packing 29 entering reciprocating element bore 24 first, followed by packing carrier 91, and then packing screw 92. Once packing screw 92 is inserted, it can be coupled with pump fluid body 8 (e.g., via threading the threads on the portion 92C of the outside diameter of packing screw 92 that is threaded with corresponding threads on the portion 24A of the inside diameter of the reciprocating element bore 24 and/or sleeve 95 that is threaded). Once coupled, packing screw 92 retains packing carrier 91 and packing 29 within reciprocating element bore 24 (and/or within a packing sleeve 95 therein).

The process can be reversed when removing packing assembly 90 from pump fluid end 22. That is, the packing screw 92 can be decoupled from the pump fluid body 8 (e.g., by dethreading the threads on the portion 92C of the outside diameter of packing screw 92 that is threaded from the corresponding threads on the portion 24A of the inside diameter of the reciprocating element bore 24 and/or sleeve 95 that is threaded), removing packing screw 92 from reciprocating element bore 24, via the back S2 of pump fluid end 22, removing packing carrier 91 from reciprocating element bore 24 via the back S2 of pump fluid end 22, and removing packing 29 from reciprocating element bore 24 via the back S2 of pump fluid end 22. In instances in which pump 10 stopped at TDC, packing screw 92, packing carrier 91, and packing 29 can be removed from reciprocating element bore 24 of pump fluid end 22 via the back S2 thereof in sequence, individually. In embodiments in which pump 10 stops such that the spacing distance between back S2 of pump fluid end 22 and the closest component of pump power end 12 (e.g., the front S1' of pump power end 12 or the component of the one or mechanical linkages 4 proximate pump fluid end 22 (e.g., front end 40A of adapter 40 proximate pump fluid end 22), whichever is closer to pump fluid end 22) allows, multiple components of packing assembly (e.g., any combination of the packing screw 92, the packing carrier 91, and the packing 29) can be removed together from pump fluid end 22 via back S2 thereof. For example, in embodiments, the packing screw 92 and the packing carrier 91 can be removed together, followed by removal of the packing 29. Alternatively, the packing screw 92 can be removed, followed by removal of the packing screw 91 and the packing 29 together. Alternatively, the packing screw 92, the packing carrier 91, and the packing 29 can be removed together, should the spacing distance so allow. For example, when pump 10 stops at BDC, maximum distance D2 may allow for removal of multiple (e.g., two or three) components of packing assembly 90 from reciprocating element 24 simultaneously. (Of course, because, when assembled, packing screw 92 is proximate back S2 of pump fluid end 22, packing carrier 91 is in the middle of packing screw 92 and packing 29, and packing 29 is distal back S2 of pump fluid end 22 relative to the packing carrier 91 and packing screw 92, packing screw 92 will always be enter pump fluid end 22 last and be removed from pump fluid end 22 first, and packing 29 will enter pump fluid end 22 first and be removed from pump fluid end 22 last, with packing carrier 91 entering pump fluid end 22 and being removed from pump fluid end 22 second.)

Also disclosed herein is a spacer assembly comprising pump fluid end 22 mounting hardware (e.g., studs or studs and spacer tubes within integration section 11 (FIG. 4)) sized to provide the minimum spacing distance described herein, such that packing screw 92, packing carrier 91, and packing 29 fit between the fluid end 22 and pushrod 30 of pump power end 12 even when crankshaft 16 is at TDC.

Also disclosed herein is a method of servicing (also referred to as "maintaining") a pump 10 of this disclosure. According to this disclosure, a method of servicing a pump 10 of this disclosure comprises accessing reciprocating element 18 of pump fluid end 22 of pump 10 comprising packing assembly 90, in an assembled configuration, wherein tail end 62 of reciprocating element 18 is coupled to front end 40A of reciprocating element adapter 40 (or another component of the one or more mechanical linkages 4 (FIG. 4)), and thereby to a pushrod 30 and crankshaft 16 of the pump power end 12. Accessing the reciprocating element 18 can comprise opening a front access port 30A.

In the assembled configuration, packing 29 of packing assembly 90 is positioned within the reciprocating element bore 24 toward a back S2 of the pump fluid end 22 proximate the pump power end 12, front side 91A of packing carrier 91 distal pump power end 12 is in contact with back side 29B of packing 29 proximate pump power end 12, and at least a portion of the front side 92A of packing screw 92 distal pump power end 12 is in contact with back side 91B of packing carrier 91 proximate pump power end 12. When packing assembly 90 is assembled in pump 10, packing screw 92 is coupled with an inside surface of the fluid end body 8 (e.g., of reciprocating element bore 24 and/or a sleeve 95 therein), such that packing screw 92 retains packing carrier 91 and packing 29 within reciprocating element bore 24 and/or packing sleeve 95 during operation of pump 10.

The method of maintaining the pump 10 of this disclosure comprising the packing assembly 90 in an assembled configuration comprises removing the reciprocating element 18 from the pump fluid end 22 or at least decoupling tail end 62 of reciprocating element 18 from adapter 40 (or, as noted above, the component of the one or more mechanical linkages 4 coupled directly therewith during operation of pump 10). The reciprocating element 18 can be accessed and removed via the open access port 30A, for example by inserting a tool through open access port 30A and engaging the tool engagement features 64 of the reciprocating element 18 with the reciprocating element engagement features 95 of the tool 92, and removing the reciprocating element 18 from the pump fluid end 22 by rotating and pulling the reciprocating element 18 via the tool 92 relative to the central axis 17A of the cylindrical body of reciprocating element 18. Once the reciprocating element 18 has been removed from pump fluid end 22 (or at least after reciprocating element 18 has been decoupled), the packing screw 92, the packing carrier 91, and the packing 29 are removed from the pump fluid end 22, from the back S2 thereof. As described hereinabove, in embodiments wherein the crankshaft 16 is at TDC, removing the packing screw 92, the packing carrier 91, and the packing 29 from the pump fluid end 22, from the back S2 thereof, comprises (i) removing the packing screw 92 through the minimum spacing distance D1, then (ii)

removing the packing carrier 91 from the pump fluid end 22, from the back S2 thereof, through the minimum spacing distance D1, and then (iii) removing the packing 29 from the pump fluid end 22, from the back S2 thereof, through the minimum spacing distance D1. When pump 10 is stopped with crankshaft 16 not at TDC, multiple components of packing assembly 90 can be removed together from pump fluid end 22, as the spacing distance allows. That is, one or more components of packing assembly 90 can be removed at a time from pump fluid end 22.

The method further comprises inserting the packing 29 (e.g., packing 29 or the packing 29 that has been repaired or otherwise maintained) or another packing 29 (e.g., a new or replacement packing 29), the packing carrier 91 (e.g., the packing carrier 91 or the packing carrier 91 that has been repaired or otherwise maintained) or another packing carrier 91 (e.g., a new or replacement packing carrier 91), the packing screw 92 (e.g., the packing screw 92 or the packing screw 92 that has been repaired or otherwise maintained) or another packing screw 92 (e.g., a new or replacement packing screw 92) into the pump fluid end 22 (e.g., into reciprocating element bore 24 and/or sleeve 95) from the back S2 thereof. The inserted packing 29 is positioned within the reciprocating element bore 24 and/or sleeve 95 therein toward the back S2 of the pump fluid end 22 such that front side 29A of packing 29 is in contact with a shoulder or stop feature 3 associated with reciprocating element bore 24 and/or sleeve 95. The inserted packing carrier 91 is positioned such that front side 91A of the inserted packing carrier 91 distal pump power end 12 is in contact with back side 29B of the inserted packing 29 proximate the pump power end. The inserted packing screw is positioned such that at least a portion of front side 92A of the inserted packing screw 92 is in contact with back side 91B of the inserted packing carrier 91 proximate the pump power end 12 and the inserted packing screw is coupled (e.g., threaded) with an inside surface of the reciprocating element bore 24 and/or packing sleeve 95. Once assembled, the inserted packing screw 92 thus retains the inserted packing carrier 91 and the inserted packing 29 within the pump fluid end 22.

Following assembly of the packing assembly 90 within pump fluid end 22, the method of maintaining pump 10 according to this disclosure further comprises, if the reciprocating element 18 was removed from pump fluid end 22, inserting the or another reciprocating element into the pump fluid end. The method further comprises coupling the tail end 62 of the or the another reciprocating element 18 to the reciprocating element adapter 40 (or the front S1' of pump power end 12 or the component of the one or more mechanical linkages 4 closest to pump fluid end 22, whichever is closer to pump fluid end 22 when pump 10 stopped).

In embodiments removing, decoupling, inserting, and/or coupling of reciprocating element 18 is effected from a front side S1 of pump fluid end 22. For example, in embodiments removing, decoupling, inserting, and/or coupling of reciprocating element 18 is effected from a front access port 30A (FIG. 1, FIG. 2 and FIG. 3). In embodiments, reciprocating element 18 comprises tool engagement features 64, as described hereinabove with reference to the embodiment of FIG. 8, and the reciprocating element 18 is removed and/or decoupled and inserted and/or recoupled via engaging the reciprocating element engagement features of the tool with the tool engagement features 64 of the reciprocating element 18, and rotating, pulling, and/or pushing on the reciprocating element 18 by correspondingly rotating, pulling, and/or pushing on an end of the tool opposite the reciprocating element engagement end of the tool.

In embodiments, a method of maintaining a pump 10 of this disclosure does not comprise rolling the pump 10 to adjust a position of the crankshaft 16 therein. As known to those of skill in the art, rolling a pump 10 to move crankshaft 16 therein can be utilized to move crankshaft 16, and thus increase the spacing distance between back S2 of pump fluid end 22 and the component of pump power end 12 proximate pump fluid end 12. Rolling pump 10 can thus be utilized to increase the spacing distance. For example, when pump 10 is stopped at TDC, providing a spacing distance equal to the minimum spacing distance D1, rolling of pump 10 is conventionally utilized to increase the spacing distance toward the maximum spacing distance D2 provided at BDC. As rolling a pump is tedious, time consuming, and exposes personnel to dangers, it is desirable to maintain pump 10 without rolling pump 10. According to this disclosure, such pump rolling is not utilized to access packing assembly 90, even when pump 10 stops with crankshaft 16 at TDC. Accordingly, a packing assembly 90 as described herein provides for positional indifference for maintenance of packing assembly 90 of pump fluid end 22 (i.e., it doesn't matter where crankshaft 16 is positioned when pump 10 is stopped for servicing/maintenance of packing assembly 90, as the pump 10 will not need to be rolled prior to servicing packing assembly 90).

In embodiments, reciprocating element 18 is inserted into or removed from pump fluid end 22 without rolling pump power end 12 (i.e., without rotating crankshaft 16 therein). Utilization of a concentric bore pump fluid end 22 (e.g., as described with reference to FIG. 3, FIG. 5A, and FIG. 5B), a reciprocating element 18 comprising tool engagement features as described herein with reference to FIG. 8, and a packing assembly 90 as described herein with reference to FIG. 6 and FIGS. 7A-7C can allow for access to and/or maintenance of fluid end components (e.g., components of a discharge valve assembly 72, components of a suction valve assembly 56, reciprocating element 18, and/or packing 29/packing assembly 90) without rolling pump 10.

In embodiments, pump 10 is a multi-bore pump, as described hereinabove, comprising three or five reciprocating element bores 24. In such embodiments, when stopped, a pushrod 30 of one or more reciprocating element bores 24 may be fully extended (e.g., the associated crankshaft 16 is at TDC), such that only minimum spacing D1 is available for removing components of packing assembly 90 therefrom. A pushrod 30 associated with one or more of the other bores 24 may not be fully extended (e.g., may be partially or fully retracted into pump power end 12, due to crankshaft 16 associated therewith not stopping at TDC), such that the spacing distance is greater than the minimum spacing distance D1, and the components of a packing assembly 90 within the one or more of the other bores 24 can be removed (one, two, or three at a time, depending on the spacing distance) through the spacing distance provided. Due to the design of the herein disclosed packing assembly 90, all of the spacer assemblies 90 of a multi-bore pump 10 (e.g., a Triplex pump or a Quintuplex pump) can be accessed from back S2 of pump fluid end 22 without rolling the pump 10.

In embodiments, as noted hereinabove with reference to the embodiment of FIG. 4, pump 10 comprises one or more additional components or mechanical linkages 4 (e.g., clamps, adapters, extensions, etc.) used to couple the reciprocating element 18 to the pump power end 12 (e.g., to pushrod 30). In some embodiments, the one or more additional components 4 comprise a reciprocating element adapter 40 further coupled to the pushrod 30 of power end 12. In such embodiments, removing the reciprocating element 18 from the pump fluid end 22 by rotating and pulling the reciprocating element 18 via the tool relative to the central axis 17 of reciprocating element 18 can further comprise decoupling (e.g., via unscrewing a threaded connection) the tail end 62 of the reciprocating element 18 from the reciprocating element adapter 40 further coupled to the pushrod 30 of the power end 12 and/or otherwise decoupling (e.g., via unscrewing a threaded connection) the tail end 62 of the reciprocating element 18 from the pushrod 30 of the power end 22. Additionally, in such embodiments, positioning the or the another reciprocating element 18 within the pump fluid end 22 by rotating and pushing the reciprocating element 18 or the another reciprocating element 18 via the tool can further comprise coupling (e.g., via screwing a threaded connection) the tail end 62 of the reciprocating element 18 or the another reciprocating element 18 with the reciprocating element adapter 40 further coupled to the pushrod 30 of the power end 12 and/or otherwise coupling (e.g., via screwing a threaded connection) the tail end 62 of the reciprocating element 18 or the another reciprocating element 18 directly with the pushrod 30 of the power end 12.

In embodiments, the one or more additional components or mechanical linkages 4 comprise a reciprocating element adapter 40 coupled to a pushrod 30 of pump power end 12 via a clamp 80 that fixedly couples the reciprocating element adapter 40 in contact with the pushrod 30 of the power end 12. In such embodiments, positioning the or the another reciprocating element 18 within the pump fluid end 22 by rotating and pushing the reciprocating element 18 or the another reciprocating element 18 via the tool can comprise coupling (e.g., via screwing a threaded connection) the tail end 62 of the reciprocating element 18 or the another reciprocating element 18 with the reciprocating element adapter 40 further coupled to the pushrod 30 of the power end 12 via the clamp 80, such that the tail end 62 of the reciprocating element 18 is fixedly coupled to the reciprocating element adapter 40, whereby, upon positioning of the reciprocating element 18 or the another reciprocating element 18 within the pump fluid end 22, a central axis of the reciprocating element 18 is parallel to or coincident with a central axis of the pushrod. Such a reciprocating element adapter is described, for example, in U.S. Patent Application Ser. No. 16/411,894, filed May 14, 2019, and is entitled "Easy Change Pump Plunger", the disclosure of which is hereby incorporated herein in its entirety for purposes not contrary to this disclosure.

The front access port 30A is closed prior to resuming operation of the pump 10.

Figure 9:
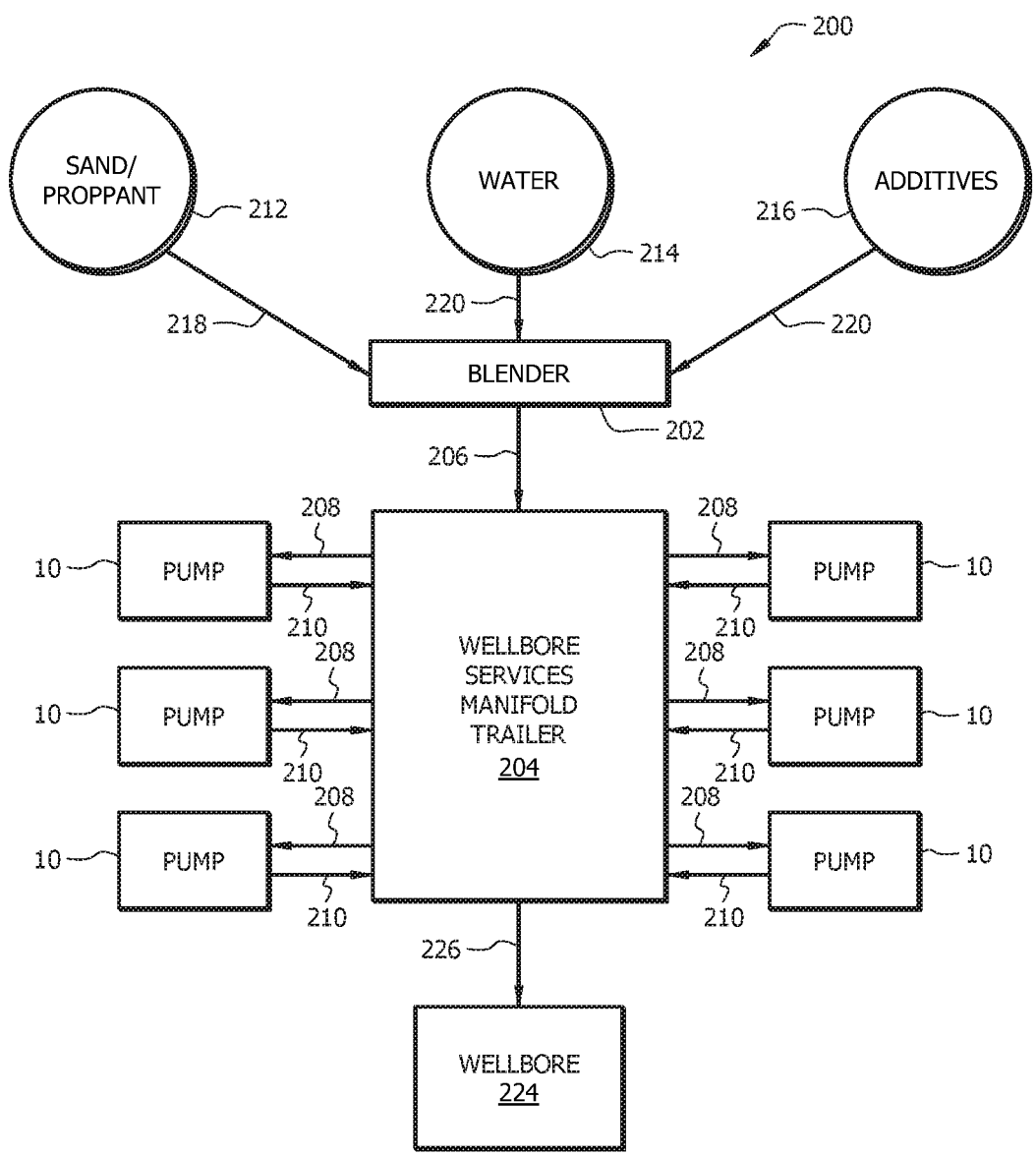
FIG. 9 is a schematic representation of an embodiment of a wellbore servicing system, according to embodiments of this disclosure.

Also disclosed herein are a method of servicing a wellbore and a wellbore servicing system 200 comprising a pump of this disclosure. An embodiment of a wellbore servicing system 200 and a method of servicing a wellbore via the wellbore servicing system 200 will now be described with reference to FIG. 9, which is a schematic representation of an embodiment of a wellbore servicing system 200, according to embodiments of this disclosure.

A method of servicing a wellbore 224 according to this disclosure comprises fluidly coupling a pump 10 of this disclosure to a source of a wellbore servicing fluid and to the wellbore, wherein the pump comprises a packing assembly 90 as described herein, in the assembled configuration, and communicating wellbore servicing fluid into the wellbore via the pump. The method of servicing wellbore 224 according to this disclosure can further comprise discontinuing the communicating of the wellbore servicing fluid into the wellbore via the pump 10, subjecting the pump 10 to maintenance to provide a maintained pump, and communicating the or another wellbore servicing fluid into the wellbore via the maintained pump 10. Subjecting the pump 10 to maintenance can comprise servicing the pump 10 as described hereinabove. In embodiments, for example, subjecting pump 10 to maintenance comprises removing the packing screw 92, the packing carrier 91, and the packing 29 from the pump fluid end 22 of pump 10, from the back S2 thereof; and inserting the packing 29 or another packing 29, the packing carrier 91 or another packing carrier 91, and the packing screw 92 or another packing screw 92 into the pump fluid end 22 from the back S2 thereof, such that the inserted packing 29 is positioned within the reciprocating element bore 24 and/or sleeve 95 toward the back S2 of the pump fluid end 22, a front side 91A of the inserted packing carrier 91 distal the pump power end 12 is in contact with a back side 29B of the inserted packing 29 proximate the pump power end 12, and at least a portion of front side 92A of the inserted packing screw 92 distal the pump power end 12 is in contact with a back side 91B of the inserted packing carrier 91 proximate the pump power end 12 and is coupled with an inside surface of the reciprocating element bore 24 and/or sleeve 95. Once the packing assembly 90 is installed, the inserted packing screw 92 retains the inserted packing carrier 91 and the inserted packing 29 within pump fluid end 22.

It will be appreciated that the wellbore servicing system 200 disclosed herein can be used for any purpose. In embodiments, the wellbore servicing system 200 may be used to service a wellbore 224 that penetrates a subterranean formation by pumping a wellbore servicing fluid into the wellbore and/or subterranean formation. As used herein, a "wellbore servicing fluid" or "servicing fluid" refers to a fluid used to drill, complete, work over, fracture, repair, or in any way prepare a well bore for the recovery of materials residing in a subterranean formation penetrated by the well bore. It is to be understood that "subterranean formation" encompasses both areas below exposed earth and areas below earth covered by water such as ocean or fresh water. Examples of servicing fluids suitable for use as the wellbore servicing fluid, the another wellbore servicing fluid, or both include, but are not limited to, cementitious fluids (e.g., cement slurries), drilling fluids or muds, spacer fluids, fracturing fluids or completion fluids, and gravel pack fluids, remedial fluids, perforating fluids, sealants, drilling fluids, completion fluids, gelation fluids, polymeric fluids, aqueous fluids, oleaginous fluids, etc.

In embodiments, the wellbore servicing system 200 comprises one or more pumps 10 operable to perform oilfield and/or well servicing operations. Such operations may include, but are not limited to, drilling operations, fracturing operations, perforating operations, fluid loss operations, primary cementing operations, secondary or remedial cementing operations, or any combination of operations thereof. Although a wellbore servicing system is illustrated, skilled artisans will readily appreciate that the pump 10 disclosed herein may be employed in any suitable operation.

In embodiments, the wellbore servicing system 200 may be a system such as a fracturing spread for fracturing wells in a hydrocarbon-containing reservoir. In fracturing operations, wellbore servicing fluids, such as particle laden fluids, are pumped at high-pressure into a wellbore. The particle laden fluids may then be introduced into a portion of a subterranean formation at a sufficient pressure and velocity to cut a casing and/or create perforation tunnels and fractures within the subterranean formation. Proppants, such as grains of sand, are mixed with the wellbore servicing fluid to keep the fractures open so that hydrocarbons may be produced from the subterranean formation and flow into the wellbore. Hydraulic fracturing may desirably create high-conductivity fluid communication between the wellbore and the subterranean formation.

The wellbore servicing system 200 comprises a blender 202 that is coupled to a wellbore services manifold trailer 204 via flowline 206. As used herein, the term "wellbore services manifold trailer" includes a truck and/or trailer comprising one or more manifolds for receiving, organizing, and/or distributing wellbore servicing fluids during wellbore servicing operations. In this embodiment, the wellbore services manifold trailer 204 is coupled to six positive displacement pumps (e.g., such as pump 10 that may be mounted to a trailer and transported to the wellsite via a semi-tractor) via outlet flowlines 208 and inlet flowlines 210. In alternative embodiments, however, there may be more or less pumps used in a wellbore servicing operation. Outlet flowlines 208 are outlet lines from the wellbore services manifold trailer 204 that supply fluid to the pumps 10. Inlet flowlines 210 are inlet lines from the pumps 10 that supply fluid to the wellbore services manifold trailer 204.

The blender 202 mixes solid and fluid components to achieve a well-blended wellbore servicing fluid. As depicted, sand or proppant 212, water 214, and additives 216 are fed into the blender 202 via feedlines 218, 220, and 212, respectively. The water 214 may be potable, non-potable, untreated, partially treated, or treated water. In embodiments, the water 214 may be produced water that has been extracted from the wellbore while producing hydrocarbons form the wellbore. The produced water may comprise dissolved and/or entrained organic materials, salts, minerals, paraffins, aromatics, resins, asphaltenes, and/or other natural or synthetic constituents that are displaced from a hydrocarbon formation during the production of the hydrocarbons. In embodiments, the water 214 may be flowback water that has previously been introduced into the wellbore during wellbore servicing operation. The flowback water may comprise some hydrocarbons, gelling agents, friction reducers, surfactants and/or remnants of wellbore servicing fluids previously introduced into the wellbore during wellbore servicing operations.

The water 214 may further comprise local surface water contained in natural and/or manmade water features (such as ditches, ponds, rivers, lakes, oceans, etc.). Still further, the water 214 may comprise water stored in local or remote containers. The water 214 may be water that originated from near the wellbore and/or may be water that has been transported to an area near the wellbore from any distance. In some embodiments, the water 214 may comprise any combination of produced water, flowback water, local surface water, and/or container stored water. In some implementations, water may be substituted by nitrogen or carbon dioxide; some in a foaming condition.

In embodiments, the blender 202 may be an Advanced Dry Polymer (ADP) blender and the additives 216 are dry blended and dry fed into the blender 202. In alternative embodiments, however, additives may be pre-blended with water using other suitable blenders, such as, but not limited to, a GEL PRO blender, which is a commercially available preblender trailer from Halliburton Energy Services, Inc., to form a liquid gel concentrate that may be fed into the blender 202. The mixing conditions of the blender 202, including time period, agitation method, pressure, and temperature of the blender 202, may be chosen by one of ordinary skill in the art with the aid of this disclosure to produce a homogeneous blend having a desirable composition, density, and viscosity. In alternative embodiments, however, sand or proppant, water, and additives may be premixed and/or stored in a storage tank before entering a wellbore services manifold trailer 204.

In embodiments, the pump(s) 10 (e.g., pump(s) 10 and/or maintained pump(s) 10) pressurize the wellbore servicing fluid to a pressure suitable for delivery into a wellbore 224 or wellhead. For example, the pumps 10 may increase the pressure of the wellbore servicing fluid (e.g., the wellbore servicing fluid and/or the another wellbore servicing fluid) to a pressure of greater than or equal to about 10,000 psi, 20,000 psi, 30,000 psi, 40,000 psi, or 50,000 psi, or higher.

From the pumps 10, the wellbore servicing fluid may reenter the wellbore services manifold trailer 204 via inlet flowlines 210 and be combined so that the wellbore servicing fluid may have a total fluid flow rate that exits from the wellbore services manifold trailer 204 through flowline 226 to the flow connector wellbore 1128 of between about 1 BPM to about 200 BPM, alternatively from between about 50 BPM to about 150 BPM, alternatively about 100 BPM. in embodiments, each of one or more pumps 10 discharge wellbore servicing fluid at a fluid flow rate of between about 1 BPM to about 200 BPM, alternatively from between about 50 BPM to about 150 BPM, alternatively about 100 BPM. Persons of ordinary skill in the art with the aid of this disclosure will appreciate that the flowlines described herein are piping that are connected together for example via flanges, collars, welds, etc. These flowlines may include various configurations of pipe tees, elbows, and the like. These flowlines connect together the various wellbore servicing fluid process equipment described herein.

Also disclosed herein are methods for servicing a wellbore (e.g., wellbore 224). Without limitation, servicing the wellbore may include: positioning the wellbore servicing composition in the wellbore 224 (e.g., via one or more pumps 10 as described herein) to isolate the subterranean formation from a portion of the wellbore; to support a conduit in the wellbore; to plug a void or crack in the conduit; to plug a void or crack in a cement sheath disposed in an annulus of the wellbore; to plug a perforation; to plug an opening between the cement sheath and the conduit; to prevent the loss of aqueous or nonaqueous drilling fluids into loss circulation zones such as a void, vugular zone, or fracture; to plug a well for abandonment purposes; to divert treatment fluids; and/or to seal an annulus between the wellbore and an expandable pipe or pipe string. In other embodiments, the wellbore servicing systems and methods may be employed in well completion operations such as primary and secondary cementing operation to isolate the subterranean formation from a different portion of the wellbore.

In embodiments, a wellbore servicing method may comprise transporting a positive displacement pump (e.g., pump 10) to a site for performing a servicing operation. Additionally or alternatively, one or more pumps may be situated on a suitable structural support. Non-limiting examples of a suitable structural support or supports include a trailer, truck, skid, barge or combinations thereof. In embodiments, a motor or other power source for a pump may be situated on a common structural support.

In embodiments, a wellbore servicing method may comprise providing a source for a wellbore servicing fluid. As described above, the wellbore servicing fluid may comprise any suitable fluid or combinations of fluid as may be appropriate based upon the servicing operation being performed. Non-limiting examples of suitable wellbore servicing fluid include a fracturing fluid (e.g., a particle laden fluid, as described herein), a perforating fluid, a cementitious fluid, a sealant, a remedial fluid, a drilling fluid (e.g., mud), a spacer fluid, a gelation fluid, a polymeric fluid, an aqueous fluid, an oleaginous fluid, an emulsion, various other wellbore servicing fluid as will be appreciated by one of skill in the art with the aid of this disclosure, and combinations thereof. The wellbore servicing fluid may be prepared on-site (e.g., via the operation of one or more blenders) or, alternatively, transported to the site of the servicing operation.

In embodiments, a wellbore servicing method may comprise fluidly coupling a pump 10 to the wellbore servicing fluid source. As such, wellbore servicing fluid may be drawn into and emitted from the pump 10. Additionally or alternatively, a portion of a wellbore servicing fluid placed in a wellbore 224 may be recycled, i.e., mixed with the water stream obtained from a water source and treated in fluid treatment system. Furthermore, a wellbore servicing method may comprise conveying the wellbore servicing fluid from its source to the wellbore via the operation of the pump 10 disclosed herein.

In alternative embodiments, the reciprocating apparatus may comprise a compressor. In embodiments, a compressor similar to the pump 10 may comprise at least one each of a cylinder, plunger, connecting rod, crankshaft, and housing, and may be coupled to a motor. In embodiments, such a compressor may be similar in form to a pump and may be configured to compress a compressible fluid (e.g., a gas) and thereby increase the pressure of the compressible fluid. For example, a compressor may be configured to direct the discharge therefrom to a chamber or vessel that collects the compressible fluid from the discharge of the compressor until a predetermined pressure is built up in the chamber. Generally, a pressure sensing device may be arranged and configured to monitor the pressure as it builds up in the chamber and to interact with the compressor when a predetermined pressure is reached. At that point, the compressor may either be shut off, or alternatively the discharge may be directed to another chamber for continued operation.

In embodiments, a reciprocating apparatus comprises an internal combustion engine, hereinafter referred to as an engine. Such engines are also well known, and typically include at least one each of a plunger, cylinder, connecting rod, and crankshaft. The arrangement of these components is substantially the same in an engine and a pump (e.g. pump 10). A reciprocating element such as a plunger 18 may be similarly arranged to move in reciprocating fashion within the cylinder. Skilled artisans will appreciate that operation of an engine may somewhat differ from that of a pump. In a pump, rotational power is generally applied to a crankshaft acting on the plunger via the connecting rod, whereas in an engine, rotational power generally results from a force (e.g., an internal combustion) exerted on or against the plunger, which acts against the crankshaft via the connecting rod.

For example, in a typical 4-stroke engine, arbitrarily beginning with the exhaust stroke, the plunger is fully extended during the exhaust stroke, (e.g., minimizing the internal volume of the cylinder). The plunger may then be retracted by inertia or other forces of the engine componentry during the intake stroke. As the plunger retracts within the cylinder, the internal volume of cylinder increases, creating a low pressure within the cylinder into which an air/fuel mixture is drawn. When the plunger is fully retracted within the cylinder, the intake stroke is complete, and the cylinder is substantially filled with the air/fuel mixture. As the crankshaft continues to rotate, the plunger may then be extended, during the compression stroke, into the cylinder compressing the air-fuel mixture within the cylinder to a higher pressure.

A spark plug may be provided to ignite the fuel at a predetermined point in the compression stroke. This ignition increases the temperature and pressure within the cylinder substantially and rapidly. In a diesel engine, however, the spark plug may be omitted, as the heat of compression derived from the high compression ratios associated with diesel engines suffices to provide spontaneous combustion of the air-fuel mixture. In either case, the heat and pressure act forcibly against the plunger and cause it to retract back into the cylinder during the power cycle at a substantial force, which may then be exerted on the connecting rod, and thereby on to the crankshaft.

Those of ordinary skill in the art will readily appreciate various benefits that may be realized by the present disclosure. For instance, the utilization of a packing assembly 90 as described herein can facilitate removal and replacement of components of packing assembly 90 within pump fluid end 22. Due to utilization of a packing assembly 90 as described herein, wherein the width W1 of the packing screw 92, the width W2 of the packing carrier 91, and the width W3 of the packing 29 measured along central axes thereof are less than the minimum spacing distance D1 of pump 10 comprising a pump fluid end 22 containing the packing assembly 90 and a pump power end 12, removal and replacement of the packing assembly 90 components can be effected from back S2 of the pump fluid end 22, without rolling the pump 10. In embodiments, utilization of a reciprocating element 18 comprising tool engagement features 64 as described herein facilitates rotating and pushing or rotating and pulling the reciprocating element 18, during insertion into the reciprocating element bore 24 or removal of reciprocating element 18 from the reciprocating element bore 24, respectively, from front S1 of pump fluid end 22. The tool engagement features 64 of reciprocating element 18, and the corresponding reciprocating element engagement features of the tool can also be used to connect the reciprocating element 18 with pump power end 12, for example, by connecting reciprocating element 18 with a reciprocating element adapter 40 and/or a pushrod 30 of pump power end 12. Utilization of a concentric bore pump fluid end 22, a reciprocating element 18 comprising tool engagement features 64 as described herein, and a packing assembly 90 as described herein can allow for access to and/or maintenance of fluid end components (e.g., components of a discharge valve assembly 72, components of a suction valve assembly 56, reciprocating element 18, and/or components of packing assembly 90) without rolling pump 10. Accordingly, utilization of the packing assembly 90 of this disclosure in a pump fluid end 22 of a pump 10 can provide for a reduction in pump fluid end 22 maintenance time by at least 10, 20, 30, 40, or 50% relative to a pump fluid end 22 not comprising a so-designed packing assembly 90. A reduction in pump fluid end 22 maintenance and/or assembly time reduces exposure of workers performing the maintenance (and thus potentially enhances safety) and also reduces non-productive time on location.

ADDITIONAL DISCLOSURE

The following are non-limiting, specific embodiments in accordance with the present disclosure:

Embodiment A

A packing assembly for a pump fluid end, the packing assembly comprising: a packing screw; a packing carrier;

and a packing, wherein the packing screw, the packing carrier, and the packing are each cylindrical and have a width measured along a central axis thereof that is less than a minimum spacing distance of a pump comprising the pump fluid end and a pump power end, wherein the pump fluid end comprises a reciprocating element bore in which a reciprocating element can be reciprocated via the pump power end via connection of a tail end of the reciprocating element to a reciprocating element adapter coupled with a pushrod and crankshaft of the pump power end, wherein the minimum spacing distance is an axial distance measured along the central axis between a back of the pump fluid end and a front end of the reciprocating element adapter when the crankshaft of the pump power end is at top dead center (TDC), and wherein the back of the pump fluid end is proximal the pump power end; and wherein the packing screw comprises threads on an outside diameter thereof, whereby the packing screw can be threadably connected with a mating thread on an inside diameter of the reciprocating element bore, such that, after positioning of the packing and the packing carrier within the reciprocating element bore such that a back side of the packing axially proximate the pump power end contacts a front side of the packing carrier axially distal the pump power end, the packing screw can be threadably connected with the reciprocating element bore whereby at least a portion of a front side of the packing screw axially distal the pump power end contacts a back side of the packing carrier axially proximate the pump power end, and the packing screw retains the packing and the packing carrier in the reciprocating element bore.

Embodiment B

The packing assembly of Embodiment A, wherein the packing comprises an elastomeric material.

Embodiment C

The packing assembly of Embodiment B, wherein the packing comprises a plurality of rings of the elastomeric material.

Embodiment D

The packing assembly of any of Embodiment A through Embodiment C, wherein the minimum spacing distance is less than or equal to about 3, 6, or 9 inches (7.6, 15.2, or 22.9 cm).

Embodiment E

A pump fluid end comprising the packing assembly of any of Embodiment A through Embodiment D.

Embodiment F

A pump comprising: a pump fluid end and a pump power end separated by a minimum spacing distance, wherein the pump fluid end comprises a packing assembly, wherein the packing assembly comprises a packing screw, a packing carrier, and a packing, wherein the packing screw, the packing carrier, and the packing are each cylindrical and have a width measured along a central axis thereof that is less than the minimum spacing distance, wherein the central axis thereof is coaxial with a central axis of the pump fluid end, wherein a front side of the packing carrier distal the pump power end is in contact with a back side of the packing proximate the pump power end, wherein at least a portion of a front side of the packing screw distal the pump power end is in contact with a back side of the packing carrier proximate the pump power end, and the packing screw is coupled with an inside surface of a reciprocating element bore of the pump fluid end, whereby the packing screw retains the packing carrier and the packing within the reciprocating element bore during operation of the pump, wherein the pump power end is operable to reciprocate a reciprocating element along a path within the reciprocating element bore of the pump fluid end during operation of the pump, when a tail end of the reciprocating element is coupled to a reciprocating element adapter and the reciprocating element adapter is coupled with a pushrod and crankshaft of the pump power end, and wherein the minimum spacing distance is an axial distance measured along the central axis between a back of the pump fluid end and a front end of the reciprocating element adapter when the crankshaft is at top dead center (TDC), and wherein the back of the pump fluid end is axially proximal the pump power end.

Embodiment G

The pump of Embodiment F, wherein the pump power end is a concentric bore pump fluid end.

Embodiment H

The pump of Embodiment F or Embodiment G, wherein the pump fluid end is a cross-bore pump fluid end.

Embodiment I

The pump of any of Embodiment F through Embodiment H, wherein the pump further comprises a cylindrical sleeve within the reciprocating element bore, and wherein the packing, the packing carrier, the packing screw, or the combination thereof is located within the sleeve toward the back of the pump fluid end.

Embodiment J

The pump of any of Embodiment F through Embodiment I, wherein the reciprocating element comprises: a front end axially opposite the tail end, wherein the front end is distal the pump power end, and wherein the front end comprises one or more tool engagement features positioned about an outer circumference of the front end of the reciprocating element, wherein the one or more tool engagement features are adapted to engage a corresponding one or more reciprocating element engagement features of a reciprocating element end of a tool, such that the reciprocating element can be rotated, pulled, and/or pushed within the reciprocating element bore via the tool.

Embodiment K

The pump of Embodiment J, wherein the one or more tool engagement features comprise one or more slots.

Embodiment L

The pump of Embodiment K, wherein the one or more slots have a shape comprising a J-shape, a T-shape, an L-shape, or a combination thereof.

Embodiment M

The pump of any of Embodiment J through Embodiment L, wherein the reciprocating element engagement features of the tool are rotatably lockable with the tool engagement features of the reciprocating element, whereby the reciprocating element can be rotated and pulled and/or rotated and pushed via the tool.

Embodiment N

The pump of Embodiment F or any of Embodiment H through Embodiment M, wherein the pump fluid end is a concentric bore pump fluid end, wherein the reciprocating element comprises a hollow fluid passage, and wherein the pump further comprises a discharge valve assembly and a suction valve assembly, wherein the discharge valve assembly is located on a side of the reciprocating element bore distal the pump power end, and wherein the suction valve assembly is coupled with the reciprocating element.

Embodiment O

A method of maintaining a pump, the method comprising: accessing a reciprocating element of a pump fluid end of a pump comprising the pump fluid end and a pump power end, wherein the pump fluid end and the pump power end have a minimum spacing distance therebetween, wherein the pump power end is operable to reciprocate the reciprocating element along a central axis of and within a reciprocating element bore of the pump fluid end during operation of the pump, wherein a tail end of the reciprocating element is coupled to a front end of a reciprocating element adapter, and wherein the reciprocating element adapter is coupled to a pushrod and crankshaft of the pump power end, wherein the pump fluid end comprises the reciprocating element, the reciprocating element bore, and a packing assembly, wherein the packing assembly comprises a packing screw, a packing carrier, and a packing, wherein the packing screw, the packing carrier, and the packing are each cylindrical and have a width measured along a central axis thereof that is less than a minimum spacing distance, wherein the central axis thereof is coaxial with a central axis of the reciprocating element bore, wherein the packing is positioned within the reciprocating element bore toward a back of the pump fluid end proximate the pump power end, wherein a front side of the packing carrier distal the pump power end is in contact with a back side of the packing proximate the pump power end, and wherein at least a portion of a front side of the packing screw distal the pump power end is in contact with a back side of the packing carrier proximate the pump power end, and the packing screw is coupled with an inside surface of the reciprocating element bore, whereby the packing screw retains the packing carrier and the packing within the reciprocating element bore during operation of the pump, and wherein the minimum spacing distance is an axial distance along the central axis between the back of the pump fluid end and the front end of the reciprocating element adapter when the crankshaft of the pump power end is at top dead center (TDC), and wherein the back of the pump fluid end is proximal the pump power end; removing the reciprocating element from the pump fluid end; removing the packing screw, the packing carrier, and the packing from the pump fluid end, from the back thereof; inserting the packing or another packing, the packing carrier or another packing carrier, and the packing screw or another packing screw into the pump fluid end from the back thereof, whereby the inserted packing is positioned within the reciprocating element bore toward the back of the pump fluid end, wherein a front side of the inserted packing carrier distal the pump power end is in contact with a back side of the inserted packing proximate the pump power end, and wherein at least a portion of a front side of the inserted packing screw distal the pump power end is in contact with a back side of the inserted packing carrier proximate the pump power end, and the packing screw is coupled with an inside surface of the reciprocating element bore, whereby the inserted packing screw retains the inserted packing carrier and the inserted packing within the reciprocating element bore; inserting the or another reciprocating element into the pump fluid end; and coupling the tail end of the or the another reciprocating element to the reciprocating element adapter.

Embodiment P

The method of Embodiment O, wherein the crankshaft is at TDC, and wherein removing the packing screw, the packing carrier, and the packing from the pump fluid end, from the back thereof, comprises (i) removing the packing screw through the minimum spacing distance, then (ii) removing the packing carrier from the pump fluid end, from the back thereof, through the minimum spacing distance, and then (iii) removing the packing from the pump fluid end, from the back thereof, through the minimum spacing distance.

Embodiment Q

The method of Embodiment O or Embodiment P, wherein the pump fluid end is a concentric bore pump fluid end.

Embodiment R

The method of any of Embodiment O through Embodiment Q, wherein the pump further comprises a cylindrical sleeve within the reciprocating element bore, and wherein the packing, the packing carrier, the packing screw, or the combination thereof is located within the sleeve.

Embodiment S: The method of any of Embodiment O through Embodiment R, wherein accessing the reciprocating element of the pump fluid end, removing the reciprocating element from the pump fluid end, inserting the or the another reciprocating element into the pump fluid end, and coupling the tail end of the or the another reciprocating element to the reciprocating element adapter are effected via a front access port of the pump fluid end, wherein the front access port of the pump fluid end is axially distal the pump power end.

Embodiment T

The method of Embodiment S: wherein the reciprocating element comprises: a front end axially opposite the tail end, wherein the front end is axially distal the pump power end, and wherein the front end of the reciprocating element comprises one or more tool engagement features positioned about an outer circumference of the front end of the reciprocating element, wherein the one or more tool engagement features are adapted to engage a corresponding one or more reciprocating element engagement features of a reciprocating element end of a tool, such that the reciprocating element can be rotated, pulled, and/or pushed within the reciprocating element bore via the tool; and wherein removing the reciprocating element from the pump fluid end, inserting the or the another reciprocating element into the pump fluid end, coupling the tail end of the or the another reciprocating element to the reciprocating element adapter, or a combination thereof is effected by: engaging the tool engagement features of the reciprocating element with the reciprocating element engagement features of the tool; and rotating, pushing, and/or pulling the reciprocating element or the another reciprocating element via the tool.

Embodiment U

The method of any of Embodiment O through Embodiment T, wherein the method does not comprise rolling the pump to adjust a position of the crankshaft therein.

Embodiment V

A method of servicing a wellbore, the method comprising: fluidly coupling a pump to a source of a wellbore servicing fluid and to the wellbore, wherein the pump comprises: a pump fluid end and a pump power end separated by a minimum spacing distance, wherein the pump fluid end comprises a packing assembly, wherein the packing assembly comprises a packing screw, a packing carrier, and a packing, and wherein the packing screw, the packing carrier, and the packing are each cylindrical and have a width along a central axis thereof that is less than the minimum spacing distance, wherein the pump power end is operable to reciprocate a reciprocating element along a central axis of and within a reciprocating element bore of the pump fluid end during operation of the pump, and wherein a tail end of the reciprocating element is coupled to a front end of a reciprocating element adapter and wherein a tail end of the reciprocating element adapter is coupled with a pushrod and a crankshaft of the pump power end, and wherein the minimum spacing distance is an axial distance along the central axis between a back of the pump fluid end and the front end of the reciprocating element adapter when the crankshaft of the pump power end is at top dead center (TDC), and wherein the back of the pump fluid end is proximal the pump power end; and communicating wellbore servicing fluid into the wellbore via the pump.

Embodiment W

The method of Embodiment V further comprising: discontinuing the communicating of the wellbore servicing fluid into the wellbore via the pump; and subjecting the pump to maintenance to provide a maintained pump, wherein subjecting the pump to maintenance comprises: removing the packing screw, the packing carrier, and the packing from the pump fluid end, from the back thereof; and inserting the packing or another packing, the packing carrier or another packing carrier, and the packing screw or another packing screw into the pump fluid end from the back thereof, whereby the inserted packing is positioned within the reciprocating element bore toward the back of the pump fluid end, wherein a front side of the inserted packing carrier distal the pump power end is in contact with a back side of the inserted packing proximate the pump power end, and wherein at least a portion of a front side of the inserted packing screw distal the pump power end is in contact with a back side of the inserted packing carrier proximate the pump power end, and the packing screw is coupled with an inside surface of the reciprocating element bore, whereby the inserted packing screw retains the inserted packing carrier and the inserted packing within the reciprocating element bore; and communicating the or another wellbore servicing fluid into the wellbore via the maintained pump.

Embodiment X

The method of Embodiment V or Embodiment W, wherein the crankshaft is at TDC, and wherein removing the packing screw, the packing carrier, and the packing from the pump fluid end, from the back thereof, comprises (i) removing the packing screw from the pump fluid end, from the back thereof, through the minimum spacing distance, then (ii) removing the packing carrier from the pump fluid end, from the back thereof, through the minimum spacing distance, and then (iii) removing the packing from the pump fluid end, from the back thereof, through the minimum spacing distance.

Embodiment Y

The method of Embodiment W or Embodiment X, wherein subjecting the pump to maintenance does not comprise rolling the pump to adjust a position of the crankshaft therein.

Embodiment Z

The method of any of Embodiment V through Embodiment Y, wherein the wellbore servicing fluid, the another wellbore servicing fluid, or both the wellbore servicing fluid and the another wellbore servicing fluid comprise a fracturing fluid, a cementitious fluid, a remedial fluid, a perforating fluid, a sealant, a drilling fluid, a spacer fluid, a completion fluid, a gravel pack fluid, a gelation fluid, a polymeric fluid, an aqueous fluid, an oleaginous fluid, or a combination thereof.

Embodiment Z1

The method of any of Embodiment V through Embodiment Z, wherein the pump or the maintained pump operates during the pumping of the wellbore servicing fluid or the another wellbore servicing fluid at a pressure of greater than or equal to about 3,000, 10,000 psi, 20,000 psi, 30,000 psi, 40,000 psi, or 50,000 psi.

Embodiment Z2

The method of any of Embodiment V through Embodiment Z1, wherein the pump or the maintained pump operates during the pumping of the wellbore servicing fluid or the another wellbore servicing fluid at a volumetric flow rate of greater than or equal to about 3, 10, or 20 barrels per minute (BPM), or in a range of from about 3 to about 20, from about 10 to about 20, or from about 5 to about 20 BPM.

Embodiment Z3

A method of maintaining a pump, the method comprising: accessing a reciprocating element of a pump fluid end of a pump comprising the pump fluid end and a pump power end, wherein the pump fluid end and the pump power end have a minimum spacing distance therebetween; removing a reciprocating element from the pump fluid end; removing a packing screw, a packing carrier, and a packing from the pump fluid end, from the back thereof, via the minimum spacing distance, wherein the minimum spacing distance is an axial distance along a central axis of the packing screw, the packing carrier, and the packing between the back of the pump fluid end and the front end of a reciprocating element adapter when the crankshaft of the pump power end is at top dead center (TDC); inserting the packing or another packing, the packing carrier or another packing carrier, and the packing screw or another packing screw into the pump fluid end from the back thereof, via the minimum spacing distance; inserting the or another reciprocating element into the pump fluid end; and coupling the or the another reciprocating element to the reciprocating element adapter.

Embodiment Z4

A method of maintaining a pump, the method comprising: removing a packing screw, a packing carrier, and/or a packing from a pump fluid end of the pump, via a back of the pump fluid end and via a spacing distance, wherein the spacing distance is an axial distance, when the crankshaft of the pump power end is stopped for the maintaining, along a central axis between the back of the pump fluid end and a front end of a mechanical linkage coupled directly with a reciprocating element during operation of the pump; and inserting the packing or another packing, the packing carrier or another packing carrier, and/or the packing screw or another packing screw into the pump fluid end from the back of the pump fluid end via the spacing distance.

Embodiment Z5

The method of Embodiment Z4, wherein the removing and the inserting are performed without rolling the pump.

Embodiment Z6

The method of Embodiment Z4 or Embodiment Z5, wherein the pump power end is stopped with a crankshaft thereof at top dead center (TDC), such that the spacing distance is a minimum spacing distance.

Embodiment Z7

The method of any of Embodiment Z4 through Embodiment Z6, wherein removing the packing screw, the packing carrier, and/or the packing from a pump fluid end comprises removing the packing screw, the packing carrier, and the packing in that order and one at a time from the pump fluid end, and/or wherein inserting the packing or the another packing, the packing carrier or the another packing carrier, and/or the packing screw or the another packing screw into the pump fluid end comprises inserting the packing, the packing carrier, and the packing screw in that order and one at a time into the pump fluid end.

Embodiment Z8

The method of any of Embodiment Z6 or Embodiment Z7, wherein the minimum spacing distance is from about 3 to about 10 inches (from about 7.62 cm to about 25.4 cm).

Embodiment Z9

The method of any of Embodiment Z4 through Embodiment Z8 further comprising, prior to the removing the packing screw, the packing carrier, and/or the packing from the pump fluid end, removing a reciprocating element from the pump fluid end, and/or, subsequent to the inserting the packing or the another packing, the packing carrier or the another packing carrier, and/or the packing screw or the another packing screw into the pump fluid end, reinserting the reciprocating element or another reciprocating element into the pump fluid end.

Embodiment Z10

The method of any of Embodiment Z4 through Embodiment Z9 wherein the mechanical linkage comprises a reciprocating element adapter.

Embodiment Z11

The method of Embodiment Z10, wherein removing the reciprocating element from the pump fluid end comprises detaching the reciprocating element from the reciprocating element adapter and/or wherein reinserting the reciprocating element or the another reciprocating element into the pump fluid end comprises attaching the or the another reciprocating element with the reciprocating element adapter.

Embodiment Z12

A pump of any Embodiment F through Embodiment M comprising a spacer assembly that provides the minimum spacing distance.

Embodiment Z13

A method comprising disconnecting a reciprocating pump plunger from a power end of a reciprocating pump to provide a spacing between a back of a fluid end of the pump and a component of the power end, and removing a packing, a packing carrier, a packing screw or combinations thereof from the fluid end via the spacing.

Embodiment Z14

The method of embodiment Z13 wherein the pump is not rolled (e.g., a crankshaft of the power end is not rotated) prior to removing the packing, the packing carrier, the packing screw or combinations thereof.

Embodiment Z15 the method of embodiment Z13 or Z14 wherein the component of the power end is a front of the power end or a front end of a plunger adapter mechanically coupled to a crankshaft of the power end.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

We claim:

1. A pump comprising:
a reciprocating element adapter, a pump fluid end and a pump power end, wherein the pump fluid end and the pump power end are separated by a minimum spacing distance, wherein the pump fluid end comprises a pump fluid end body having therein a reciprocating element bore in which, during operation, a reciprocating element is reciprocated via the pump power end via connection of a tail end of the reciprocating element to the reciprocating element adapter, wherein the reciprocating element adapter is coupled with a pushrod and crankshaft of the pump power end, wherein the minimum spacing distance is an axial distance measured along the central axis between a back of the pump fluid end and a front end of the reciprocating element adapter when the crankshaft of the pump power end is at top dead center (TDC), and wherein the back of the pump fluid end is proximal the pump power end, and wherein the pump fluid end comprises a packing assembly, wherein the packing assembly comprises:
a packing screw;
a packing carrier; and
a packing,
wherein the packing screw, the packing carrier, and the packing are each cylindrical and have a width measured along a central axis thereof that is less than the minimum spacing distance; and
wherein the packing screw comprises threads on an outside diameter thereof, whereby the packing screw is threadably connected with a mating thread on an inside diameter of the reciprocating element bore, such that during operation of the pump, the packing and the packing carrier are positioned within the pump fluid end body such that a back side of the packing axially proximate the pump power end contacts a front side of the packing carrier axially distal the pump power end, and the packing screw is threadably connected with the reciprocating element bore whereby at least a portion of a front side of the packing screw axially distal the pump power end contacts a back side of the packing carrier axially proximate the pump power end, the packing screw retains the packing and the packing carrier in the reciprocating element bore, and wherein the back side of the packing carrier is entirely inside the pump fluid end, such that the packing carrier does not extend axially beyond the back of the pump fluid end, and
wherein the pump fluid end is a concentric bore pump fluid end, and wherein the reciprocating element adapter comprises an inlet port and provides a fluid flow path for a fluid being pumped by the pump through the inlet port of the reciprocating element adapter to a suction valve assembly associated with a front end the reciprocating element.

2. The pump of claim 1, wherein the minimum spacing distance is less than or equal to 9 inches (22.9 cm).

3. The pump of claim 1, wherein the pump further comprises a cylindrical sleeve within the reciprocating element bore, and wherein the packing, the packing carrier, the packing screw, or the combination thereof is located within the sleeve toward the back of the pump fluid end.

4. A pump comprising:
a reciprocating element adapter, a pump fluid end and a pump power end, wherein the pump fluid end and the pump power end are separated by a minimum spacing distance, wherein the pump fluid end comprises a pump fluid end body having therein a reciprocating element bore in which, during operation, a reciprocating element is reciprocated via the pump power end via connection of a tail end of the reciprocating element to the reciprocating element adapter, wherein the reciprocating element adapter is coupled with a pushrod and crankshaft of the pump power end, wherein the minimum spacing distance is an axial distance measured along the central axis between a back of the pump fluid end and a front end of the reciprocating element adapter when the crankshaft of the pump power end is at top dead center (TDC), wherein the back of the pump fluid end is proximal the pump power end, wherein the pump fluid end is a concentric bore pump fluid end, and wherein the reciprocating element adapter comprises an inlet port and provides a fluid flow path for a fluid being pumped by the pump through the inlet port of the reciprocating element adapter to a suction valve assembly associated with a front end of the reciprocating element, and wherein the pump fluid end comprises a packing assembly, wherein the packing assembly comprises a packing screw, a packing carrier, and a packing, wherein the packing screw, the packing carrier, and the packing are each cylindrical and have a width measured along a central axis thereof that is less than the minimum spacing distance, wherein the central axis thereof is coaxial with a central axis of the pump fluid end, wherein a front side of the packing carrier distal the pump power end is in contact with a back side of the packing proximate the pump power end, wherein at least a portion of a front side of the packing screw distal the pump power end is in contact with a back side of the packing carrier proximate the pump power end, and the packing screw is coupled with an inside surface of a reciprocating element bore within a pump fluid end body of the pump fluid end, whereby the packing screw retains the packing carrier and the packing within the pump fluid end body during operation of the pump, and wherein the back side of the packing carrier is entirely inside the pump fluid end, such that the packing carrier does not extend axially beyond a back of the pump fluid end, wherein the pump power end is operable to reciprocate the reciprocating element along a path within the reciprocating element bore of the pump fluid end during operation of the pump, when the tail end of the reciprocating element is coupled to the reciprocating element adapter and the reciprocating element adapter is coupled with the pushrod and crankshaft of the pump power end, and wherein the reciprocating element comprises:

a uniform outer circumference from the tail end to a front end axially opposite the tail end, wherein the front end is distal the pump power end, wherein the front end comprises one or more tool engagement features positioned about an outer circumference of the front end of the reciprocating element, wherein the one or more tool engagement features are adapted to engage a corresponding one or more reciprocating element engagement features of a reciprocating element end of a tool, such that the reciprocating element is operable to be be rotated, pulled, and/or pushed within the reciprocating element bore via the tool.

5. The pump of claim 4, wherein the pump further comprises a cylindrical sleeve within the reciprocating element bore, and wherein the packing, the packing carrier, the packing screw, or the combination thereof is located within the sleeve toward the back of the pump fluid end.

6. The pump of claim 4, wherein the reciprocating element engagement features of the tool are rotatably lockable with the tool engagement features of the reciprocating element, whereby the reciprocating element is operable to be rotated and pulled and/or rotated and pushed via the tool.

7. The pump of claim 4, wherein the minimum spacing distance is less than or to about 9 inches (22.9 cm).

8. A method of maintaining a pump, the method comprising:

accessing a reciprocating element of a pump fluid end of a pump comprising the pump fluid end and a pump power end, wherein the pump fluid end and the pump power end have a minimum spacing distance therebetween, wherein the pump power end is operable to reciprocate the reciprocating element along a central axis of and within a reciprocating element bore of the pump fluid end during operation of the pump, wherein a tail end of the reciprocating element is coupled to a front end of a reciprocating element adapter, wherein the reciprocating element adapter is coupled to a pushrod and crankshaft of the pump power end, and wherein the pump fluid end is a concentric bore pump fluid end, and wherein the reciprocating element adapter comprises an inlet port and provides a fluid flow path for a fluid being pumped by the pump through the inlet port of the reciprocating adapter to a suction valve assembly associated with a front end of the reciprocating element, wherein the pump fluid end comprises the reciprocating element, the reciprocating element bore, and a packing assembly, wherein the packing assembly comprises a packing screw, a packing carrier, and a packing, wherein the packing screw, the packing carrier, and the packing are each cylindrical and have a width measured along a central axis thereof that is less than a minimum spacing distance, wherein the central axis thereof is coaxial with a central axis of the reciprocating element bore, wherein the packing is positioned within the reciprocating element bore toward a back of the pump fluid end proximate the pump power end, wherein a front side of the packing carrier distal the pump power end is in contact with a back side of the packing proximate the pump power end, and wherein at least a portion of a front side of the packing screw distal the pump power end is in contact with a back side of the packing carrier proximate the pump power end, and the packing screw is coupled with an inside surface of the reciprocating element bore, whereby the packing screw retains the packing carrier and the packing within the reciprocating element bore during operation of the pump, and wherein the minimum spacing distance is an axial distance along the central axis between the back of the pump fluid end and the front end of the reciprocating element adapter when the crankshaft of the pump power end is at top dead center (TDC), and wherein the back of the pump fluid end is proximal the pump power end;

removing the reciprocating element from the pump fluid end;

removing the packing screw, the packing carrier, and the packing from the pump fluid end, from the back thereof;

inserting the packing or another packing, the packing carrier or another packing carrier, and the packing screw or another packing screw into the pump fluid end from the back thereof, whereby the inserted packing is positioned within the reciprocating element bore toward the back of the pump fluid end, wherein a front side of the inserted packing carrier distal the pump power end is in contact with a back side of the inserted packing proximate the pump power end, and wherein at least a portion of a front side of the inserted packing screw distal the pump power end is in contact with a back side of the inserted packing carrier proximate the pump power end, and the packing screw is coupled with an inside surface of the reciprocating element bore, whereby the inserted packing screw retains the inserted packing carrier and the inserted packing within the reciprocating element bore;

inserting the or another reciprocating element into the pump fluid end; and coupling the tail end of the or the another reciprocating element to the reciprocating element adapter.

9. The method of claim 8, wherein the crankshaft is at TDC, and wherein removing the packing screw, the packing carrier, and the packing from the pump fluid end, from the back thereof, comprises (i) removing the packing screw through the minimum spacing distance, then (ii) removing the packing carrier from the pump fluid end, from the back thereof, through the minimum spacing distance, and then (iii) removing the packing from the pump fluid end, from the back thereof, through the minimum spacing distance.

10. The method of claim 8, wherein accessing the reciprocating element of the pump fluid end, removing the reciprocating element from the pump fluid end, inserting the or the another reciprocating element into the pump fluid end, and coupling the tail end of the or the another reciprocating element to the reciprocating element adapter are effected via a front access port of the pump fluid end, wherein the front access port of the pump fluid end is axially distal the pump power end.

11. The method of claim 10, wherein the reciprocating element comprises: a uniform outer circumference from the tail end to a front end axially opposite the tail end, wherein the front end is distal the pump power end, wherein the front end comprises one or more tool engagement features positioned about an outer circumference of the front end of the reciprocating element, wherein the one or more tool engagement features are adapted to engage a corresponding one or more reciprocating element engagement features of a reciprocating element end of a tool, such that the reciprocating element is operable to be rotated, pulled, and/or pushed within the reciprocating element bore via the tool, and:
  wherein removing the reciprocating element from the pump fluid end, inserting the or the another reciprocating element into the pump fluid end, coupling the tail end of the or the another reciprocating element to the reciprocating element adapter, or a combination thereof is effected by:
  engaging the tool engagement features of the reciprocating element with the reciprocating element engagement features of the tool; and
  rotating, pushing, and/or pulling the reciprocating element or the another reciprocating element via the tool.

12. The method of claim 11, wherein the method does not comprise rolling the pump to adjust a position of the crankshaft therein.

13. The method of claim 8, wherein the pump further comprises a cylindrical sleeve within the reciprocating element bore, and wherein the packing, the packing carrier, the packing screw, or the combination thereof is located within the sleeve toward the back of the pump fluid end.

14. A method of servicing a wellbore, the method comprising:
  fluidly coupling a pump to a source of a wellbore servicing fluid and to the wellbore, wherein the pump comprises:
    a reciprocating element adapter, a pump fluid end and a pump power end, wherein the pump fluid end and the pump power end are separated by a minimum spacing distance,
    wherein the pump fluid end comprises a packing assembly, wherein the packing assembly comprises a packing screw, a packing carrier, and a packing, and wherein the packing screw, the packing carrier, and the packing are each cylindrical and have a width along a central axis thereof that is less than the minimum spacing distance,
    wherein the pump power end is operable to reciprocate a reciprocating element along a central axis of and within a reciprocating element bore of the pump fluid end during operation of the pump, and wherein a tail end of the reciprocating element is coupled to a front end of the reciprocating element adapter, wherein a tail end of the reciprocating element adapter is coupled with a pushrod and a crankshaft of the pump power end, and wherein the pump fluid end is a concentric bore pump fluid end, and wherein the reciprocating element adapter comprises an inlet port and provides a fluid flow path for the wellbore servicing fluid through the inlet port of the reciprocating adapter to a suction valve assembly associated with a front end of the reciprocating element, and
    wherein the minimum spacing distance is an axial distance along the central axis between a back of the pump fluid end and the front end of the reciprocating element adapter when the crankshaft of the pump power end is at top dead center (TDC), wherein the back of the pump fluid end is proximal the pump power end, wherein the packing and the packing carrier are positioned within the pump fluid end such that a back side of the packing axially proximate the pump power end contacts a front side of the packing carrier axially distal the pump power end, and wherein a back side of the packing carrier axially proximate the pump power end is entirely inside the pump fluid end, such that the packing carrier does not extend axially beyond the back of the pump fluid end; and
  communicating wellbore servicing fluid into the wellbore via the pump.

15. The method of claim 14 further comprising:
  discontinuing the communicating of the wellbore servicing fluid into the wellbore via the pump; and
  subjecting the pump to maintenance to provide a maintained pump, wherein subjecting the pump to maintenance comprises:
    removing the packing screw, the packing carrier, and the packing from the pump fluid end, from the back thereof; and
    inserting the packing or another packing, the packing carrier or another packing carrier, and the packing screw or another packing screw into the pump fluid end from the back thereof, whereby the inserted packing is positioned within the reciprocating element bore toward the back of the pump fluid end, wherein a front side of the inserted packing carrier distal the pump power end is in contact with a back side of the inserted packing proximate the pump power end, and wherein at least a portion of a front side of the inserted packing screw distal the pump power end is in contact with a back side of the inserted packing carrier proximate the pump power end, and the packing screw is coupled with an inside surface of the reciprocating element bore, whereby the inserted packing screw retains the inserted packing carrier and the inserted packing within the reciprocating element bore; and
  communicating the or another wellbore servicing fluid into the wellbore via the maintained pump.

16. The method of claim 15, wherein the crankshaft is at TDC, and wherein removing the packing screw, the packing carrier, and the packing from the pump fluid end, from the back thereof, comprises (i) removing the packing screw from the pump fluid end, from the back thereof, through the minimum spacing distance, then (ii) removing the packing carrier from the pump fluid end, from the back thereof, through the minimum spacing distance, and then (iii) removing the packing from the pump fluid end, from the back thereof, through the minimum spacing distance.

17. The method of claim 15, wherein subjecting the pump to maintenance does not comprise rolling the pump to adjust a position of the crankshaft therein.

18. The method of claim 15, wherein the wellbore servicing fluid, the another wellbore servicing fluid, or both the wellbore servicing fluid and the another wellbore servicing fluid comprise a fracturing fluid, a cementitious fluid, a remedial fluid, a perforating fluid, a sealant, a drilling fluid, a spacer fluid, a completion fluid, a gravel pack fluid, a gelation fluid, a polymeric fluid, an aqueous fluid, an oleaginous fluid, or a combination thereof.

19. The method of claim 15, wherein the pump or the maintained pump operates during the pumping of the wellbore servicing fluid or the another wellbore servicing fluid at a pressure of greater than or equal to 3,000 psi.

20. The method of claim 15, wherein the pump or the maintained pump operates during the pumping of the wellbore servicing fluid or the another wellbore servicing fluid at a volumetric flow rate in a range of from 3 to 20 barrels per minute (BPM).

* * * * *